(12) United States Patent
Vig et al.

(10) Patent No.: US 12,229,011 B2
(45) Date of Patent: Feb. 18, 2025

(54) SCALABLE LOG-BASED CONTINUOUS DATA PROTECTION FOR DISTRIBUTED DATABASES

(71) Applicant: Amazon Technologies, Inc., Seattle, WA (US)

(72) Inventors: Akshat Vig, Seattle, WA (US); Parikshit Shivajirao Pol, Seattle, WA (US); Subramanian Sankara Subramanian, Seattle, WA (US); Rama Krishna Sandeep Pokkunuri, Seattle, WA (US); Rajaprabhu Thiruchi Loganathan, Issaquah, WA (US); Harini Chandrasekharan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 16/575,296

(22) Filed: Sep. 18, 2019

(65) Prior Publication Data
US 2020/0012568 A1 Jan. 9, 2020

Related U.S. Application Data

(63) Continuation of application No. 14/977,472, filed on Dec. 21, 2015, now Pat. No. 10,423,493.

(51) Int. Cl.
*G06F 11/14* (2006.01)
*G06F 16/18* (2019.01)
*G06F 16/23* (2019.01)

(52) U.S. Cl.
CPC ...... *G06F 11/1451* (2013.01); *G06F 16/1815* (2019.01); *G06F 16/2322* (2019.01)

(58) Field of Classification Search
CPC ............. G06F 11/1451; G06F 16/1815; G06F 16/2322; G06F 11/0757; G06F 11/2094;
(Continued)

(56) References Cited

U.S. PATENT DOCUMENTS

| | | |
|---|---|---|
| 5,586,264 A | 12/1996 | Belknap et al. |
| 5,615,364 A | 3/1997 | Marks |

(Continued)

FOREIGN PATENT DOCUMENTS

| | | |
|---|---|---|
| CN | 104750773 | 7/2015 |
| JP | 2014141343 | 8/2014 |

(Continued)

OTHER PUBLICATIONS

U.S. Appl. No. 15/717,606, filed Sep. 27, 2017, Vaibhav Jain.
(Continued)

*Primary Examiner* — Pierre M Vital
*Assistant Examiner* — Andrew N Ho
(74) *Attorney, Agent, or Firm* — Robert C. Kowert; Kowert, Hood, Munyon, Rankin & Goetzel, P.C.

(57) ABSTRACT

In response to determining that continuous data protection is to be enabled for a particular table of a database service, a service component verifies that automated transmission of change records of the table to a log-structured journal has been configured. A given change record comprises a before-image and an after-image associated with a committed database write, and is assigned a unique sequence number. In response to a determination to restore the table as of a specified point in time, a restore record set is identified from the journal with respect to a selected snapshot of the table. The restore record set includes change records which are not represented in the snapshot and are to be represented in the restored table. A restore result table is created using the selected snapshot and the restore record set.

17 Claims, 18 Drawing Sheets

(58) Field of Classification Search
CPC ............. G06F 2201/84; G06F 11/1471; G06F 11/3006; G06F 11/3055
See application file for complete search history.

(56) References Cited

U.S. PATENT DOCUMENTS

| | | |
|---|---|---|
| 5,692,177 A | 11/1997 | Miller |
| 5,768,527 A | 6/1998 | Zhu et al. |
| 5,813,009 A | 9/1998 | Johnson et al. |
| 5,842,222 A | 11/1998 | Nishimura et al. |
| 5,991,772 A | 11/1999 | Doherty et al. |
| 6,016,553 A | 1/2000 | Schneider |
| 6,085,200 A | 7/2000 | Hill et al. |
| 6,161,109 A | 12/2000 | Matamoros et al. |
| 6,199,074 B1 | 3/2001 | Kern et al. |
| 6,272,598 B1 | 8/2001 | Arlitt et al. |
| 6,374,266 B1 | 4/2002 | Shnelvar |
| 6,374,267 B1 | 4/2002 | Tam |
| 6,397,351 B1 | 5/2002 | Miller et al. |
| 6,505,216 B1 | 1/2003 | Schutzman et al. |
| 6,611,850 B1 | 8/2003 | Shen |
| 6,651,077 B1 | 11/2003 | East et al. |
| 6,728,735 B1 | 4/2004 | Fong |
| 6,728,879 B1 | 4/2004 | Atkinson |
| 7,096,392 B2 | 8/2006 | Sim-Tang |
| 7,328,226 B1 | 2/2008 | Karr et al. |
| 7,330,859 B2 | 2/2008 | Gupta et al. |
| 7,343,356 B2 | 3/2008 | Prahlad et al. |
| 7,353,241 B2 | 4/2008 | Erlingsson |
| 7,373,364 B1 | 5/2008 | Chapman |
| 7,386,586 B1 | 6/2008 | Headley et al. |
| 7,509,358 B1 | 3/2009 | Bingham et al. |
| 7,546,428 B1 | 6/2009 | McAndrews et al. |
| 7,565,661 B2 | 7/2009 | Sim-Tang |
| 7,577,807 B2 | 8/2009 | Rowan |
| 7,587,431 B1 * | 9/2009 | Rao ................... G06F 11/1471 |
| 7,606,841 B1 | 10/2009 | Ranade |
| 7,606,844 B2 | 10/2009 | Kottomtharayil |
| 7,653,668 B1 | 1/2010 | Shelat et al. |
| 7,657,781 B1 | 2/2010 | Dixon et al. |
| 7,668,876 B1 | 2/2010 | Kulkarni |
| 7,680,843 B1 | 3/2010 | Panchbudhe et al. |
| 7,689,597 B1 | 3/2010 | Bingham et al. |
| 7,716,186 B2 | 5/2010 | Cannon et al. |
| 7,730,034 B1 | 6/2010 | Deflaux et al. |
| 7,774,313 B1 * | 8/2010 | Nachenberg ........ G06F 11/1471 |
| | | 707/694 |
| 7,792,802 B1 | 9/2010 | Rao |
| 7,801,866 B1 * | 9/2010 | Kathuria ............. G06F 16/2358 |
| | | 707/682 |
| 7,802,001 B1 | 9/2010 | Petry et al. |
| 7,840,766 B2 | 11/2010 | Eguchi |
| 7,860,836 B1 * | 12/2010 | Natanzon ............ G06F 11/1471 |
| | | 707/648 |
| 7,921,077 B2 | 4/2011 | Ting et al. |
| 7,949,662 B2 | 5/2011 | Farber et al. |
| 7,979,649 B1 * | 7/2011 | Thiam ................. G06F 11/1448 |
| | | 711/161 |
| 8,041,679 B1 | 10/2011 | Narayanan |
| 8,065,278 B2 | 11/2011 | Beatty et al. |
| 8,065,442 B1 * | 11/2011 | Chatterjee .......... G06F 11/1471 |
| | | 707/648 |
| 8,078,582 B2 | 12/2011 | Wang et al. |
| 8,095,745 B1 | 1/2012 | Schmidt et al. |
| 8,108,343 B2 | 1/2012 | Wang et al. |
| 8,108,429 B2 | 1/2012 | Sim-Tang |
| 8,117,164 B2 | 2/2012 | Spektor et al. |
| 8,161,255 B2 | 4/2012 | Anglin et al. |
| 8,166,263 B2 | 4/2012 | Prahlad et al. |
| 8,190,960 B1 | 5/2012 | Bahadur et al. |
| 8,200,615 B2 | 6/2012 | Halliday |
| 8,200,706 B1 | 6/2012 | Sim-Tang |
| 8,244,679 B1 | 8/2012 | Bilsborough |
| 8,255,739 B1 | 8/2012 | Chatterjee et al. |
| 8,271,447 B1 * | 9/2012 | Natanzon ............ G06F 11/1471 |
| | | 707/660 |
| 8,332,842 B2 | 12/2012 | Bauer et al. |
| 8,335,771 B1 * | 12/2012 | Natanzon ............ G06F 11/2074 |
| | | 707/684 |
| 8,359,596 B2 | 1/2013 | Kobayashi et al. |
| 8,364,648 B1 * | 1/2013 | Sim-Tang ............... G06F 16/20 |
| | | 707/674 |
| 8,386,631 B2 | 2/2013 | Nilsson et al. |
| 8,386,771 B2 | 2/2013 | Baker et al. |
| 8,429,198 B1 | 4/2013 | Sim-Tang |
| 8,463,633 B2 | 6/2013 | Jung et al. |
| 8,478,726 B2 | 7/2013 | Habermann et al. |
| 8,488,661 B2 | 7/2013 | Menon et al. |
| 8,510,270 B2 | 8/2013 | Pareek et al. |
| 8,521,695 B2 | 8/2013 | Zwilling et al. |
| 8,533,478 B2 | 9/2013 | Aguilera et al. |
| 8,543,746 B2 | 9/2013 | Roever |
| 8,548,945 B2 | 10/2013 | Dwyer et al. |
| 8,554,734 B1 * | 10/2013 | Chatterjee ............ G06F 21/645 |
| | | 707/674 |
| 8,566,286 B1 | 10/2013 | Hawton et al. |
| 8,572,091 B1 | 10/2013 | Sivasubramanian et al. |
| 8,612,700 B1 | 12/2013 | Armstrong et al. |
| 8,626,709 B2 | 1/2014 | Isaacson et al. |
| 8,635,187 B2 | 1/2014 | Beatty et al. |
| 8,650,155 B2 | 2/2014 | Corbin et al. |
| 8,676,752 B2 | 3/2014 | Kundu et al. |
| 8,677,189 B2 | 3/2014 | Das |
| 8,688,645 B2 | 4/2014 | Sadhwani |
| 8,706,992 B2 | 4/2014 | Liu |
| 8,712,970 B1 | 4/2014 | Sim-Tang |
| 8,719,362 B2 | 5/2014 | Wu et al. |
| 8,725,934 B2 | 5/2014 | Batwara et al. |
| 8,769,223 B2 | 7/2014 | Boldt |
| 8,805,810 B2 | 8/2014 | Lucas |
| 8,806,154 B1 | 8/2014 | Gupta |
| 8,818,954 B1 | 8/2014 | Bergant et al. |
| 8,825,938 B1 | 9/2014 | Ellard et al. |
| 8,892,938 B1 | 11/2014 | Sundaram et al. |
| 9,009,115 B2 | 4/2015 | Cisler |
| 9,116,847 B2 | 8/2015 | Liu |
| 9,183,200 B1 | 11/2015 | Liu et al. |
| 9,183,268 B2 | 11/2015 | Novick et al. |
| 9,235,606 B1 | 1/2016 | Mooney et al. |
| 9,552,382 B2 | 1/2017 | Barrus |
| 9,558,078 B2 | 1/2017 | Farlee et al. |
| 9,703,640 B2 | 7/2017 | Beatty |
| 9,720,991 B2 | 8/2017 | Kritchko et al. |
| 9,734,021 B1 | 8/2017 | Sanocki et al. |
| 9,785,510 B1 | 10/2017 | Madhavarapu et al. |
| 9,823,973 B1 | 11/2017 | Natanzon |
| 10,037,251 B1 * | 7/2018 | Bono ................... G06F 11/2097 |
| 10,162,715 B1 | 12/2018 | MacDonald McAlister et al. |
| 10,338,972 B1 | 7/2019 | Acheson |
| 10,756,976 B2 | 8/2020 | Tomkins |
| 10,884,869 B2 | 1/2021 | Shaull |
| 11,392,557 B1 | 7/2022 | Fuller |
| 2001/0047380 A1 | 11/2001 | Fuller |
| 2002/0114341 A1 | 8/2002 | Sutherland et al. |
| 2002/0152299 A1 | 10/2002 | Traversat et al. |
| 2002/0184239 A1 * | 12/2002 | Mosher, Jr. ......... G06F 11/1474 |
| 2003/0220935 A1 | 11/2003 | Vivian et al. |
| 2004/0215803 A1 | 10/2004 | Traversat et al. |
| 2005/0022213 A1 | 1/2005 | Yamagami |
| 2005/0027819 A1 | 2/2005 | Nakano |
| 2005/0188256 A1 | 8/2005 | Stager et al. |
| 2005/0235016 A1 * | 10/2005 | Amano ................ G06F 11/1435 |
| 2005/0251540 A1 | 11/2005 | Sim-Tang |
| 2005/0262097 A1 | 11/2005 | Sim-Tang |
| 2006/0020634 A1 | 1/2006 | Huras et al. |
| 2006/0053262 A1 | 3/2006 | Prahlad et al. |
| 2006/0100972 A1 | 5/2006 | Chianese et al. |
| 2006/0173935 A1 | 8/2006 | Merchant |
| 2006/0253600 A1 | 11/2006 | Hannuksela |
| 2006/0288183 A1 * | 12/2006 | Boaz ................... G06F 11/1451 |
| | | 711/164 |
| 2007/0027937 A1 | 2/2007 | McGrattan et al. |
| 2007/0050577 A1 | 3/2007 | Kimura |

(56) References Cited

U.S. PATENT DOCUMENTS

| | | |
|---|---|---|
| 2007/0088973 A1* | 4/2007 | Passerini ............ G06F 11/1435 714/6.1 |
| 2007/0112893 A1* | 5/2007 | Okada ................. G06F 11/1471 |
| 2007/0162516 A1 | 7/2007 | Thiel et al. |
| 2007/0233699 A1 | 10/2007 | Taniguchi |
| 2007/0245107 A1* | 10/2007 | Kano .................. G06F 11/1435 711/163 |
| 2007/0250835 A1 | 10/2007 | Kobayashi et al. |
| 2007/0276884 A1 | 11/2007 | Hara et al. |
| 2007/0288530 A1 | 12/2007 | Romem et al. |
| 2007/0294274 A1* | 12/2007 | Kano ...................... G06F 16/10 |
| 2008/0034013 A1 | 2/2008 | Cisler |
| 2008/0177994 A1 | 7/2008 | Mayer |
| 2008/0281879 A1* | 11/2008 | Kawamura ......... G06F 11/1469 |
| 2008/0294696 A1 | 11/2008 | Frandzel |
| 2008/0307018 A1 | 12/2008 | Ulrich |
| 2008/0307020 A1 | 12/2008 | Ko |
| 2009/0125362 A1 | 5/2009 | Reid et al. |
| 2009/0238262 A1 | 9/2009 | Miceli |
| 2009/0254721 A1 | 10/2009 | Suzuki |
| 2009/0271605 A1 | 10/2009 | Park et al. |
| 2010/0005259 A1 | 1/2010 | Prahlad et al. |
| 2010/0077173 A1* | 3/2010 | Rao ......................... G06F 16/22 711/170 |
| 2010/0146004 A1 | 6/2010 | Sim-Tang |
| 2010/0169594 A1 | 7/2010 | Tsaur |
| 2010/0257138 A1 | 10/2010 | Wang et al. |
| 2010/0257140 A1 | 10/2010 | Davis et al. |
| 2010/0262717 A1 | 10/2010 | Critchley et al. |
| 2010/0274762 A1 | 10/2010 | Murphy et al. |
| 2011/0055506 A1 | 3/2011 | Eguchi |
| 2011/0083098 A1* | 4/2011 | Cisler ..................... G06F 9/451 715/781 |
| 2011/0137899 A1 | 6/2011 | Lyon-Smith |
| 2011/0141882 A1 | 6/2011 | Rieschl et al. |
| 2011/0178985 A1 | 7/2011 | San Martin Arribas et al. |
| 2011/0258239 A1 | 10/2011 | Petrocelli |
| 2011/0282842 A1* | 11/2011 | Popovski ............ G06F 11/1435 707/649 |
| 2012/0143825 A1* | 6/2012 | Boehm ............... G06F 11/1451 707/648 |
| 2012/0166401 A1 | 6/2012 | Li et al. |
| 2012/0209817 A1 | 8/2012 | Golab et al. |
| 2012/0221715 A1 | 8/2012 | Hamada |
| 2012/0250682 A1 | 10/2012 | Vincent et al. |
| 2012/0265890 A1 | 10/2012 | Carlson et al. |
| 2012/0297246 A1 | 11/2012 | Liu |
| 2012/0303999 A1 | 11/2012 | Calder et al. |
| 2012/0317274 A1 | 12/2012 | Richter et al. |
| 2012/0317583 A1 | 12/2012 | Corbea et al. |
| 2013/0018853 A1 | 1/2013 | Jayaraman et al. |
| 2013/0073724 A1 | 3/2013 | Parashar et al. |
| 2013/0124466 A1 | 5/2013 | Naidu et al. |
| 2013/0124483 A1 | 5/2013 | Furuhashi et al. |
| 2013/0124917 A1 | 5/2013 | Das |
| 2013/0132604 A1 | 5/2013 | Cohen et al. |
| 2013/0151683 A1 | 6/2013 | Jain et al. |
| 2013/0152047 A1 | 6/2013 | Moorthi et al. |
| 2013/0166556 A1 | 6/2013 | Baeumges et al. |
| 2013/0262388 A1 | 10/2013 | Sorenson et al. |
| 2013/0262389 A1 | 10/2013 | Rathof et al. |
| 2013/0290642 A1 | 10/2013 | Huang et al. |
| 2013/0346366 A1 | 12/2013 | Ananthanarayanan et al. |
| 2014/0019413 A1 | 1/2014 | Braam et al. |
| 2014/0019421 A1 | 1/2014 | Jagadeesan |
| 2014/0019696 A1 | 1/2014 | Linde |
| 2014/0046906 A1 | 2/2014 | Patiejunas et al. |
| 2014/0047263 A1 | 2/2014 | Coatney et al. |
| 2014/0074787 A1 | 3/2014 | Berman |
| 2014/0181042 A1 | 6/2014 | Toyama et al. |
| 2014/0279905 A1 | 9/2014 | Muniswamy-Reddy et al. |
| 2014/0324785 A1 | 10/2014 | Gupta et al. |
| 2014/0358844 A1 | 12/2014 | Mundlapudi et al. |
| 2015/0172412 A1 | 6/2015 | Escriva et al. |
| 2016/0077744 A1 | 3/2016 | Pundir et al. |
| 2016/0077923 A1 | 3/2016 | Zhang et al. |
| 2016/0179568 A1 | 6/2016 | Bezbaruah |
| 2016/0241676 A1 | 8/2016 | Armstrong |
| 2016/0267105 A1 | 9/2016 | Sun |
| 2016/0306709 A1 | 10/2016 | Shaull |
| 2017/0093755 A1 | 3/2017 | Pol |
| 2017/0315728 A1 | 11/2017 | Zheng |
| 2019/0332267 A1 | 10/2019 | Muniswamy-Reddy |
| 2019/0332268 A1 | 10/2019 | Greenwood |
| 2019/0347351 A1 | 11/2019 | Koomthanam |
| 2020/0067772 A1 | 2/2020 | Tomkins |
| 2020/0133786 A1 | 4/2020 | Ramabhadran |
| 2020/0159413 A1 | 5/2020 | Seal |
| 2020/0311142 A1 | 10/2020 | Edelman |

FOREIGN PATENT DOCUMENTS

| | | | |
|---|---|---|---|
| JP | 6331976 B2 * | 5/2018 | ........... G06F 9/4418 |
| WO | 2012168365 | 12/2012 | |

OTHER PUBLICATIONS

U.S. Appl. No. 15/717,614, filed Sep. 27, 2017, Vaibhav Jain.

"Cloud Spanner: TrueTime and External Consistency", Retrieved from URL: https://cloud.google.com/spanner/docs/true-time-external-consistency on Feb. 28, 2018, pp. 1-6.

Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.

Barbara Liskov, "Practical Uses of Synchronized Clocks in Distributed Systems", ACM, copyright 1991 ACM, pp. 1-9.

James C. Corbrett, et al., "Spanner: Google's Globally-Distributed Database", Published in the Proceeding of OSDI 2012, 2012, pp. 1-14.

Friedemann Mattern, "Virtual Time and Global States of Distributed Systems", In the Proceedings of the International Workshop on Parallel and Distributed Algorithms, Oct. 1988, pp. 120-134.

U.S. Appl. No. 15/918,920, filed Mar. 12, 2018, Tate Andrew Certain, et al.

"Capturing Table Activity with DynamoDB Streams", dated Oct. 19, 2018, pp. 1-8.

Randall Hunt "New—Amazon DynamoDB Continuous Backups and Points-In-Time Recovery", Mar. 26, 2018, pp. 1-9.

"Appendix E. Realese Notes", (PostgreSQL: Documentation: 10: E.144. Release 9.0.7), Oct. 19, 2018, pp. 1-4.

"PostgreSQL: The World's Most Advanced Open Source Relational Database", (https://www.postgresql.org), dated Oct. 19, 2018, pp. 1-10.

U.S. Appl. No. 15/728,271, filed Oct. 9, 2017, Pradeep Jnana Madhavarapu.

U.S. Appl. No. 15/676,933, filed Aug. 14, 2017, Elizabeth Sanocki.

U.S. Appl. No. 16/231,109, filed Dec. 21, 2018, Grant Alexander MacDonald.

U.S. Appl. No. 14/977,453, filed Dec. 21, 2015, Yan Valerie Leshinsky.

U.S. Appl. No. 15/807,367, filed Nov. 8, 2017, Vaibhav Jain.

U.S. Appl. No. 15/920,207, filed Mar. 13, 2018, Akshat Vig.

U.S. Appl. No. 16/101,153, filed Aug. 10, 2018, Akshat Vig.

U.S. Appl. No. 15/920,193, filed Mar. 13, 2018, Akshat Vig.

U.S. Appl. No. 16/197,033, filed Nov. 20, 2018, Rachit Jain.

U.S. Appl. No. 16/231,109, filed Dec. 21, 2018, Grant Alexander MacDonald McAlister.

Amazon Web Services, "Amazon DynamoDB Developer Guide", API Version, Aug. 10, 2012, pp. 1-793.

Amazon Web Services, "Amazon DynamoDB Streams API Reference", API Version, Aug. 10, 2012, pp. 1-29.

U.S. Appl. No. 14/077,173, filed Nov. 11, 2013, Marvin Michael Theimer et al.

U.S. Appl. No. 14/077,171, filed Nov. 11, 2013, Marvin Michael Theimer et al.

(56) References Cited

OTHER PUBLICATIONS

U.S. Appl. No. 14/136,624, filed Dec. 20, 2013, Marvin Michael Theimer et al.
U.S. Appl. No. 14/136,645, filed Dec. 20, 2013, Marvin Michael Theimer et al.
U.S. Appl. No. 14/077,167, filed Nov. 11, 2013, Marvin Michael Theimer et al.
U.S. Appl. No. 14/077,162, filed Nov. 11, 2013, Marvin Michael Theimer et al.
U.S. Appl. No. 14/316,674, filed Jun. 26, 2014, Allan Henry Vermeulen et al.
U.S. Appl. No. 14/537,788, filed Nov. 10, 2014, Lei Ye et al.
International Search Report and Written Opinion From PCT/US2014/065057, Dated Feb. 20, 2015, Amazon Technologies, Inc., pp. 1-13.
Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.
Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.
"Oozie-Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdfon Feb. 11, 2013. pp. 1-140.
Apache Kafka, "A High-Throughput Distributed Messaging System", pp. 1-42, Oct. 8, 2013.
Amazon Web Services, "Amazon Simple Queue Service (Amazon SQS)", pp. 1-5, Oct. 8, 2013.
Apache Software Foundation, "Hadoop Streaming", pp. 7-17, 2008.
SIGMOD Record, "Parallel Data Processing with MapReduce: A Survey", Kyong-Ha Lee, et al., pp. 11-20, Dec. 2011.
Splunk Inc., "Splunk for Application Management", pp. 1-2, 2012.
GitHub, "Rationale", pp. 1-2, Oct. 8, 2013.
GitHub, "Tutorial", pp. 1-8, Oct. 8, 2013.
U.S. Appl. No. 13/764,716, filed Feb. 11, 2013, Kathryn Marie Shih et al.
U.S. Appl. No. 13/764,711, filed Feb. 11, 2013, Kathryn Marie Shih et al.
U.S. Appl. No. 61/738,967, filed Dec. 18, 2012, Kathryn Marie Shih et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, Dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermeulen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.

\* cited by examiner

US 12,229,011 B2

SCALABLE LOG-BASED CONTINUOUS DATA PROTECTION FOR DISTRIBUTED DATABASES

BACKGROUND

This application is a continuation of U.S. patent application Ser. No. 14/977,472, filed Dec. 21, 2015, which is hereby incorporated by reference herein in its entirety.

Several leading technology organizations are investing in building technologies that sell "software-as-a-service". Such services provide access to shared storage (e.g., database systems) and/or computing resources to clients or subscribers. Within multi-tier e-commerce systems, combinations of different types of resources may be allocated to subscribers and/or their applications, such as whole physical or virtual machines, CPUs, memory, network bandwidth, or I/O (input/output) capacity.

One of the many benefits of using the software-as-a-service approach is that providing the desired levels of availability, data durability and scalability becomes the responsibility of the service operator. Clients of the services may simply decide what levels of availability, durability and performance they wish to pay for, and leave the implementation details to the services. The service operators may consequently establish numerous data centers, often geographically distributed across different cities, states, or even countries, and populate the data centers with computing, networking, and storage infrastructure based on expectations of client usage levels for the various services. The specific resources used for a given client may be selected from several different data centers, for example, to achieve desired levels of fault tolerance and data durability.

Some service operators may implement a provisioned-throughput model for a high-performance distributed database service, in which the resources allocated for a particular data object such as a table may be selected so that a targeted level of throughput can be guaranteed for client I/O operations. Table contents may be partitioned across several different nodes, for example, to enable larger numbers of read and write requests from clients to be handled than would have been possible if the table was stored at a single node. In such performance-constrained environments, it may be problematic to add workload associated with secondary tasks like index management, backup and restore to the service nodes responsible for fulfilling client requests.

Figure 1:
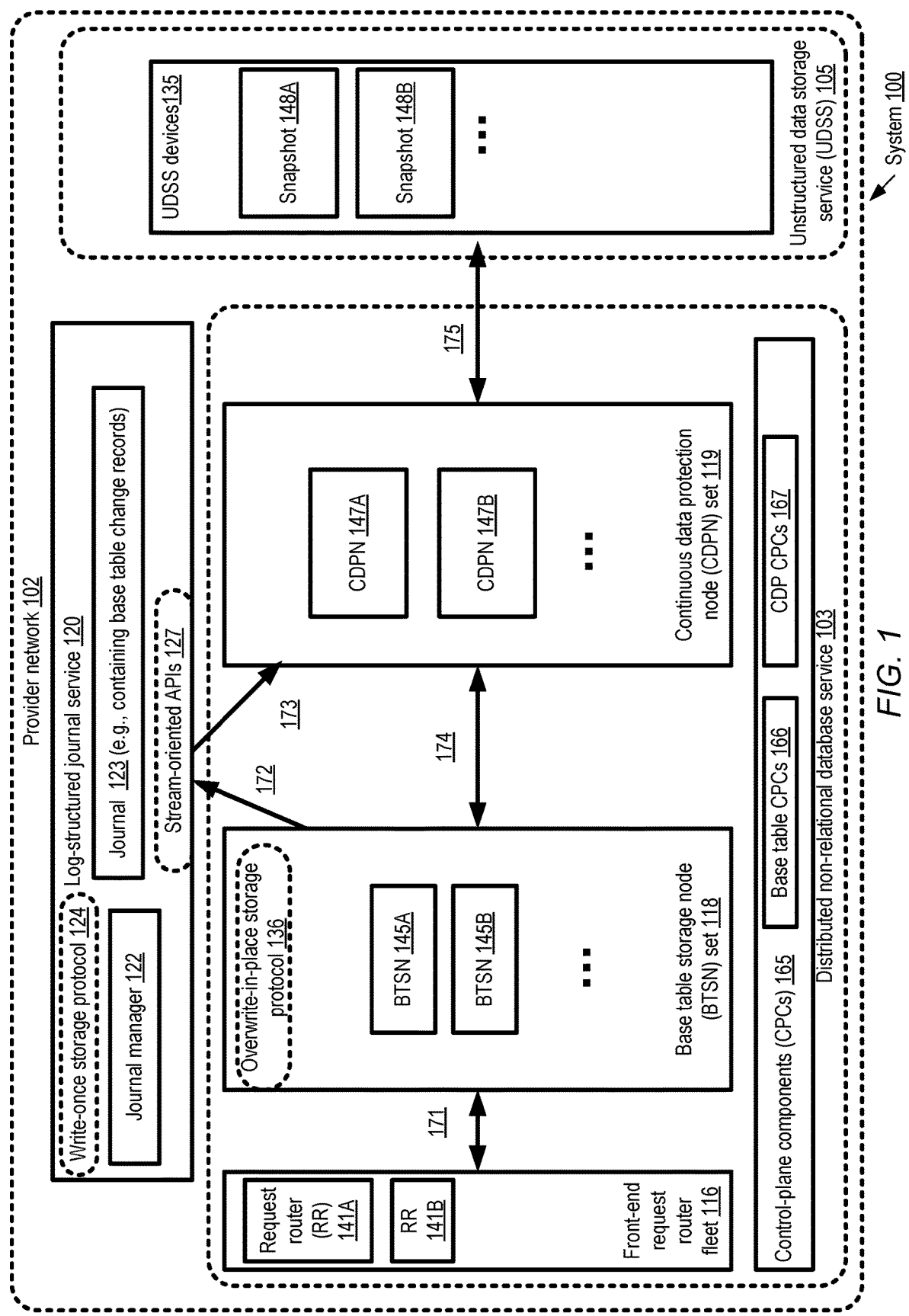
FIG. 1 illustrates an example system environment in which a log-structured journal service may be utilized to provide continuous data protection for a distributed database service of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for utilizing log-structured journals comprising database change records to support continuous data protection and global secondary indexes at a distributed non-relational database service of a provider network are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

The journal may be used to store records of committed state changes of database objects in various embodiments, with each change record indicating the respective state of a data object before and after a particular write operation (or a group of write operations) is committed, while the database service may typically store only the current (most recently committed state) of any given data object. In some embodiments, different data storage protocols or storage engine architectures may be used for the database service than are used at the journal. For example, the database service may comprise numerous storage nodes at which the contents of tables and associated indexes may be stored using a storage protocol in which data objects are overwritten in place, while (as implied by the term "log-structured") the journals may implement a write-once storage protocol in which once a log record is appended to the log, it is not overwritten. In at least one embodiment, the journal may be implemented as part of a different service than the distributed database, with each service comprising its own set of control-plane (administrative) and data-plane components. A log-structured journal service may also be referred to as a stream management service in various embodiments in which stream-oriented programmatic interfaces are supported for writing to and reading from the journals. Examples of such stream-oriented programmatic interfaces are discussed below. In one embodiment, the same kind of write protocol may be implemented for the journal and for the database.

In various embodiments, as indicated earlier, each change record appended to the journal may comprise a before-image and an after-image with respect to a write transaction committed to the distributed database on behalf of a client. Change records may also include sequence numbers indicative of the order in which the records were processed by a journal manager. The journal manager may be responsible for de-duplication of change records, e.g., to ensure that a given change is represented in the log-structured journal no more than once. The log records may be replicated across multiple journal storage devices in some embodiments, e.g., to achieve a desired level of data durability, availability and performance. Independently of the journal contents (e.g., using a different replication protocol and/or different replication nodes), database table and index contents may also be replicated in various embodiments.

The storing of change records of the database to the log-structured journal may be a non-default option in some embodiments. Change record logging may be started with respect to a given table or set of tables in response to any of various triggers in such embodiments—e.g., if a client requests the enabling of continuous data protection for the tables, or if a client requests the creation of one or more global secondary indexes. A global secondary index, as discussed in further detail below, is an index which enables queries based on non-primary keys of a key-value table to be performed efficiently. Change record logging may also be requested using a parameter of a table creation request in some embodiments.

According to one embodiment, a component of the distributed database service (e.g., an administrative or control-plane component) may receive a request from a client to enable continuous data protection for a particular table. In response to the request, the transmission of change records of the particular table from the table storage nodes to a log-structured journal may be initiated. In addition, in at least one embodiment, the generation or preparation of a sequence of snapshots (e.g., which a given snapshot of the sequence being produced after a specified interval, or based on detection of various triggering conditions as discussed below) of the particular table may also be initiated in response to the continuous data protection enablement request. Each snapshot of the sequence may represent the results of write operations performed on the particular table up to a corresponding snapshot request time. In at least one embodiment, the snapshots may be stored at a different storage service than the database service, e.g., so that the storage and computing resources of the database service itself are not used up for the snapshots. In some embodiments, a control-plane component may be able to verify that the transmission of change records is already underway for the tables, and/or that the automated creation and storage of table snapshots is already configured, in which case operations to initiate change log record logging or to schedule snapshots may not be required. That is, in at least some embodiments the components responsible for the continuous data protection capability may be able to utilize snapshots which are already being created for the targeted tables, and may not have to re-initiate logging of change requests at the journal if the logging has already been initiated.

In various embodiments in which continuous data protection is to be supported, the storage nodes may periodically transmit time marker records (e.g., in addition to change records with before and after values corresponding to committed transactions) to the journal manager. If and when a request for a point-in-time restore of a table is received at the database, indicating a targeted restoration time, a particular snapshot of the sequence of snapshots of the table may be identified as a base snapshot to be used to restore the table. For example, if the targeted restoration time is 10:00 AM on a particular day, the snapshot whose creation time is closest to (and earlier than) 10:00 AM may be selected as the base snapshot. A restore record set, comprising change records representing writes to the table that occurred after the last write included in the base snapshot and before the targeted restoration time may be selected from the journal (e.g., using the time marker records). In some embodiments timestamps (e.g., based on local clocks of the base table storage nodes) may be included in some or all change records, in which case special time marker records may not be required. A restore-result table may then be generated by applying the changes indicated in the restore record set to the base snapshot. Depending on the parameters indicated in the restore request, a new table containing the point-in-time version of the base table contents may be generated, or the original base table may be overwritten in place.

It is noted that the journal-based continuous data protection techniques described herein may be used at databases that support any of a variety of data models in different embodiments, and are not restricted to databases that support a particular data model. In one embodiment, a restore-result table may be created in a database which supports a different data model than the original database—that is, cross-data-model point-in-time restores may be performed. Consider an example scenario in which a provider network includes at least two database services: DBService1 which implements a non-relational data model, and DBService2 which implements a relational model. Continuous data protection is enabled on a table T1 which is stored at DBService1. Change records and/or snapshots of the table T1 may be stored in a data-model-independent format in some embodiments (or in a format which allows translations of data across data models). Depending on the preferences of the client on whose behalf T1 is restored, a restore-result table may be generated either in DBService1, or in DBService2. For example, within the point-in-time restore request, the client may indicate a target table name at either database service. Restores may be performed in either direction in the example scenario—e.g., a table T2 initially created in the relational database service DBService2 may be restored to non-relational database service DBService1. In some cases, the same snapshot may be used to generate respective restore-result tables according to several different data models, and/or a given change record may be applied to restore tables according to several different data models. In some embodiments, different database instances managed within the same database service may implement respective data models, and restores may be performed from a first database instance implementing a first data model to another instance implementing a different data model. In at least one embodiment, logic for transforming or translating snapshot contents and change record contents into tables corresponding to a variety of data models (e.g., one or more variants of relational data models and/or various types of non-relational data models) may be incorporated within the service nodes responsible for table restoration.

The log-structured journal may implement a set of stream-oriented programmatic interfaces in some embodiments. Such programmatic interfaces may be used by the base table storage nodes to submit change records and time marker records, and by the continuous data protection nodes to retrieve change records of the restore record sets. In one embodiment, database clients may also examine the change records of the journal using the stream-oriented programmatic interfaces.

In some embodiments, a partitioning algorithm may be implemented for tables and indexes of the distributed database. For example, when a table is created, a primary key which can be used for distributing table records into partitions (using a hash based algorithm and/or other partitioning algorithms) may be specified. In some implementations, a provisioned throughput specification may be included in a table creation request and/or an index creation request, indicating an I/O throughput levels to be supported for the table or index. The number of partitions into which the table or index is to be subdivided may be determined based on the provisioned throughput—for example, if a table is to be provisioned 4000 I/O operations per second (IOPS), and the storage node resources available at the database allow 1000 IOPS per partition per storage node, four partitions may be created for the table and four storage nodes may be allocated for the table. In some embodiments, the log-structured journal may also be partitioned into logical sub-units called shards, and the log records associated with a given table partition may be stored within a respective shard of the log. After a given journal shard reaches a certain size or a certain age, in some embodiment one or more child chards may be generated from it, potentially forming a chain or graph of shards corresponding to the same partition. Furthermore, in at least some embodiments, snapshots may also be created (at least initially) on a per-partition basis. In such partitioned environments, the service components responsible for identifying the snapshots to be used for a given restore request and for identifying the restore records set may utilize metadata mappings identifying the particular snapshots created for the different partitions, the particular shards (or shard graphs) used for various partitions, etc., and for ensuring that the restore-result table includes the changes for all the relevant partitions up to the restoration-target time.

After change record logging to the journal is configured for a given table (e.g., as a result of a request for enabling continuous data protection, as a result of a request to create a secondary index, or as a result of a client's request to view changes using a stream-oriented interface), the results of all the writes performed on the table may be represented in the journal in various embodiments. That is, the journal may serve as an authoritative source of the changes committed to the table. As such, in addition to being used for point-in-time restores, the journal may also be used for various other purposes, including the materialization of subsets of the table contents for global secondary indexes.

In some non-relational key-value based database systems, the base tables may be best suited for queries whose predicates are specified in terms of the primary keys of the base tables. For some database applications, queries whose predicates are formulated in terms of non-primary-key base table attributes may also have to be supported efficiently. Global secondary indexes may be created to handle the latter class of queries in some embodiments. A global secondary index may re-materialize a subset of the attributes of the base table in various embodiments—that is, logically, a global secondary index may be considered a partial (or full) copy of the base table contents, indexed in a different way than the base table to support some types of queries more efficiently than would have been possible with the base table alone. Such indexes may be termed "global" in that they may support queries for the entire table, as opposed to "local" secondary indexes which may be set up for partition-level queries in some embodiments.

In one embodiment, in response to a request to establish a global secondary index, a component of the database service may initiate the transmission of change records to a log-structured journal (or verify that change records are already being propagated to the journal). One or more index storage nodes may be configured to store the contents of the requested global secondary index. One or more change record propagators may be established in some embodiments to read change records of the base table from the journal (e.g., using the journal's stream-oriented programmatic interfaces), determine whether a given change record is relevant to (i.e., would result in a change to the contents of) the global secondary index, and transmit the relevant change record contents to the index storage nodes. A given change record propagator may be used for multiple global secondary indexes in some embodiments—e.g., the propagator may act as a multiplexed filter and transmitter of change records relevant to respective global secondary index nodes. In some cases, depending on the respective sets of attributes materialized or projected at various secondary indexes established for a given table, the same change record may be propagated to several different index storage nodes; other change records may only have to be propagated to a single index storage node.

When a change record is received at an index storage node, the contents of the portion of the global secondary index stored locally may be updated—that is, the changes that were materialized initially at the base table storage node may be reproduced with respect to the appropriate subset of attributes which are projected to the global secondary index at that index storage node. As in the case of the continuous data protection techniques described above, the techniques used for creating and managing global secondary indexes may also be implemented in a partitioned manner in some embodiments—that is multiple partitions may be established for a given index based on provisioned throughput settings for the index, per-partition index storage nodes may be configured, and so on. In some embodiments, to avoid burdening the database service nodes that are responsible for base table operations (e.g., receiving and routing client requests directed to the base tables, performing control-plane operations with respect to the base tables, etc.), separate sets of database service nodes may be established for global secondary indexes than are established for the base tables as discussed below.

Example System Environment for Continuous Data Protection

FIG. 1 illustrates an example system environment in which a log-structured journal service may be utilized to provide continuous data protection for a distributed database service of a provider network, according to at least some embodiments. Generally speaking, continuous data protection (CDP) may enable database clients to reconstruct or restore the state of various database objects (e.g., tables and/or indexes) as of a client-specified point of time in the depicted embodiment. Continuous data protection may be useful for recovering from various types of mistaken or erroneous update sequences, for example, for replicating the contents of the database without incorporating the latest set of writes directed to the database, or for various other purposes. As shown, system 100 includes a provider network 102 at which a number of network-accessible services may be implemented, including a distributed non-relational database service 103, an unstructured data storage service 105, and a log-structured journal service 120. Each service may include respective control-plane or administrative components and data-plane components; the data-plane components may be responsible primarily for non-administrative tasks associated with processing, transmitting or storing client data. In some embodiments, each of the services may implement a respective set of programmatic interfaces for its clients. The clients of one service may include components of another service—for example, components of the distributed database service 103 may act as clients of the log-structured journal service 120 and/or the storage service 105 to implement continuous data protection for database tables. The programmatic interfaces implemented at the various services may also be utilized by entities that are not part of other services—e.g., database service clients, on whose behalf various tables and/or indexes are established in the database service 103, may view change records pertaining to their tables using the stream-oriented application programmatic interfaces APIs 127 of the log-structured journal service 120.

In the embodiment depicted in FIG. 1, the resources of the distributed non-relational database service 103 include a front-end request router fleet 116, a base table storage node (BTSN) set 118, a continuous data protection node (CDPN) set 119, and control-plane components (CPCs) 165. In some embodiments, the database service 103 may also include other nodes, such as index storage nodes, which are not shown in FIG. 1. As discussed below in the context of FIG. 2, a given BTSN 145 (such as BTSN 145A or 145B) may comprise one or more processes or threads of execution running at a particular host. Similarly, a given CDPN 147 (e.g., CDPN 147A or 147B) may also comprise one or more processes or threads of execution running at a particular host; in some cases, a given host may be shared among multiple BTSNs 145, multiple CDPNs 147, or a combination of BTSNs and CDPNs. As indicated by their name, the BTSNs may be responsible for storing contents of the base tables, and responding to I/O requests 171 directed at the base tables which have been forwarded to the BTSNs by the request routers (RRs) 141 (e.g., RR 141A or 141B). Any of a variety of industry-standard and/or proprietary storage protocols and/or storage engines may be used at the BTSNs 145 in different embodiments. For example, in the depicted embodiment, an overwrite-in-place storage protocol 136 may be used at the BTSNs 145. In accordance with such a protocol, the latest version of a given data object (such as a record or row of a table) may be stored by overwriting the previous version. As such, once a particular write directed to the object has been committed at the database service 103, the previous version of the object may no longer be available at the BTSN at which the object is stored.

In contrast to the overwrite-in-place protocol 136 implemented at the BTSNs 145, a write-once storage protocol 124 may be used at the log-structured journal service 120. A journal manager 122 (e.g., a control-plane component of the log-structured journal service 120) may receive write requests from journal clients (such as BTSNs 145). If a write request meets the journal manager's acceptance criteria (e.g., if the write request is not a duplicate of a previously accepted write request), a corresponding journal entry may be appended to the journal 123 with a sequence number indicative of the order in which the write request was processed by the journal manager relative to other write requests in the depicted embodiment. Once a journal entry is appended to the journal, it may not be overwritten in place in the depicted embodiment in accordance with the write-once storage protocol 124.

In the depicted embodiment, if a request to enable continuous data protection for a particular base table is received at the distributed database service, one or more control-plane components (e.g., a base table CPC 166 and/or a continuous data protection CPC 167) may check whether change records of the table are already being submitted to the log-structured journal service. A change record may comprise a logical and/or a physical representation of the modifications resulting from a committed write-containing transaction directed at the base table in the depicted embodiment. For example, in one implementation the change record may indicate before-values and after-values for various attributes of one or more records of the base table which were modified in the committed transaction. If change records containing such before-values (which may also be referred to as before-images or pre-images) and after-values (which may also be referred to as after-images or post-images) are not already being prepared and transmitted to the journal manager 122, the appropriate configuration operations may be performed at one or more BTSNs to initiate the transmission 172 of such change records in the depicted embodiments, so that the change records can be used to enable continuous data protection. In addition to the change records themselves, the BTSNs may also be configured to start submitting a sequence of time marker records (e.g., containing timestamps generated every N seconds at the BTSN) to the journal manager 122 in the depicted embodiment. The journal manager may verify that a submitted change record and/or time marker record meets acceptance criteria and append it to journal 123. In various embodiments the submitting BTSN may include a session-level sequence number in its write requests to the journal manager 122, and the journal manager may generate a shard-level or a table-level sequence number (e.g., based at least in part on the session-level sequence number) for each of the records appended to journal 123.

In addition to initiating or verifying the submission of change records to the journal, the automated generation of a sequence of snapshots 148 (e.g., snapshots 148A or 148B) of the base table for which continuous data protection is desired may be initiated in the depicted embodiment, if such snapshots are not already being stored. In one embodiment, for example, a new snapshot 148 containing representations of the writes performed up to a corresponding snapshot creation time may be generated every X hours, or based on various other triggering conditions as discussed below in further detail. In the depicted embodiment, one or more CDPNs 147 may be responsible for reading the base table contents from the BTSNs (as indicated by arrow 174) and copying the base table contents to selected storage devices 135 to create the snapshots 148. Such a pipelined approach may decouple the work of creating snapshots from the client workload being handled at the BTSNs, thereby minimizing the impact of snapshot creation on the BTSNs themselves.

In order to reconstruct or restore the state of the base table as of a particular point in time (e.g., in response to a point-in-time restore request received for the table from a client), a particular snapshot may be selected as a base snapshot, and a set of changes recorded in journal 123 after the selected snapshot was created may be applied to the selected snapshot. If, for example, a client requests that a table Table1 be restored to time T1, the particular snapshot 148 which was created most recently before T1 may be identified (e.g., by a CDP control-plane component 167) as the base snapshot. The snapshot creation time of that snapshot, the time marker records inserted in journal 123, and/or the targeted restoration time T1 may be used to identify the restore record set of change records from journal 123 which are to be applied to the base snapshot. As indicated by arrows 173, the restore record set may be read by one or more CDPNs, and applied to the base snapshot to generate the restore-result table corresponding to the restore request. Depending on the preferences of the database client on whose behalf the restoration is being performed, the original base table may be overwritten by the restore-result table, or a new table may be created (potentially at different BTSNs than were being used for the original base table). In the depicted embodiment, the CDPNs may be responsible for orchestrating the creation of the snapshots and the restore-result table, but the contents of the snapshots and the restore-result tables may not be stored at the CDPNs themselves—instead, BTSNs may be used for the restore-result tables, and the unstructured data storage service 105 may be used for snapshots. The unstructured data storage service may, for example, implement a web services interface, in which respective unique URLs (uniform record locators) may be used to access corresponding unstructured data objects. In other embodiments, a different mapping of database objects and responsibilities to nodes may be used—for example, snapshots may be stored at CDPNs and/or at BTSNs, or restore-result tables may be stored at least temporarily at a storage service other than the database service. In one embodiment, the responsibilities of the CDPNs and BTSNs may be combined into a single type of database service node. In some embodiments, a storage service which does not necessarily support a web services interface or unstructured objects may be used for snapshots.

In some embodiments, at least some of the operations and techniques described in the context of FIG. 1 may be performed on a per-partition level—e.g., respective BTSNs may be deployed for the partitions of a table, respective shards of the journal may be used for respective partitions, partition-level snapshots may be created, request routers may identify target BTSNs based on partition keys indicated in client I/O requests, and so on, as discussed below in further detail. Metadata describing the partition-related mappings for a given table (e.g., which BTSNs store each of the table's partitions, which journal shards contain change records of each partition, which snapshots correspond to each partition, etc.) may be maintained at the control plane of the database service 103 in such embodiments, and used to orchestrate table-level snapshot creation and restores. By dedicating a separate set of resources (e.g., CDPNs 147, CPS control-plane components 167, storage service devices 135 at which snapshots are stored, and various resources of the journal service 120) to continuous data protection functions, the impact of providing the point-in-time restore functionality on the BTSNs may be minimized in various embodiments.

Process-to-Host Mapping Examples

Figure 2B:
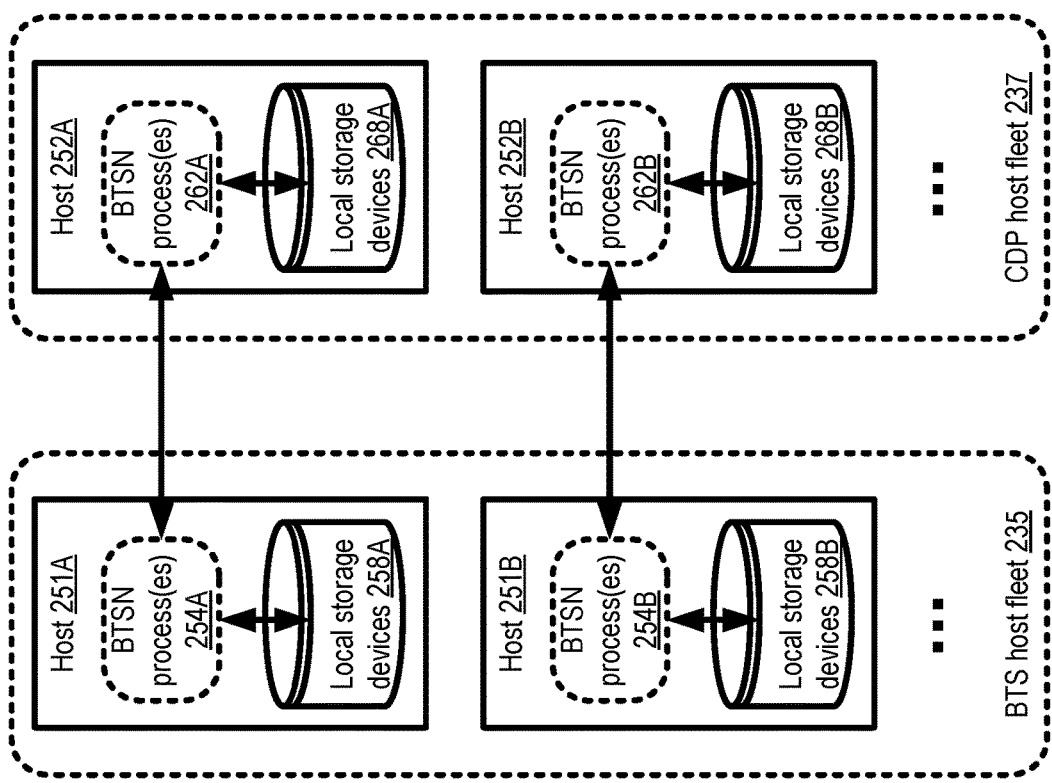
FIG. 2*a* and FIG. 2*b* illustrate respective examples of different approaches for hosting base table storage node processes of a distributed database and continuous data protection processes of the distributed database, according to at least some embodiments.
Figure 2A:
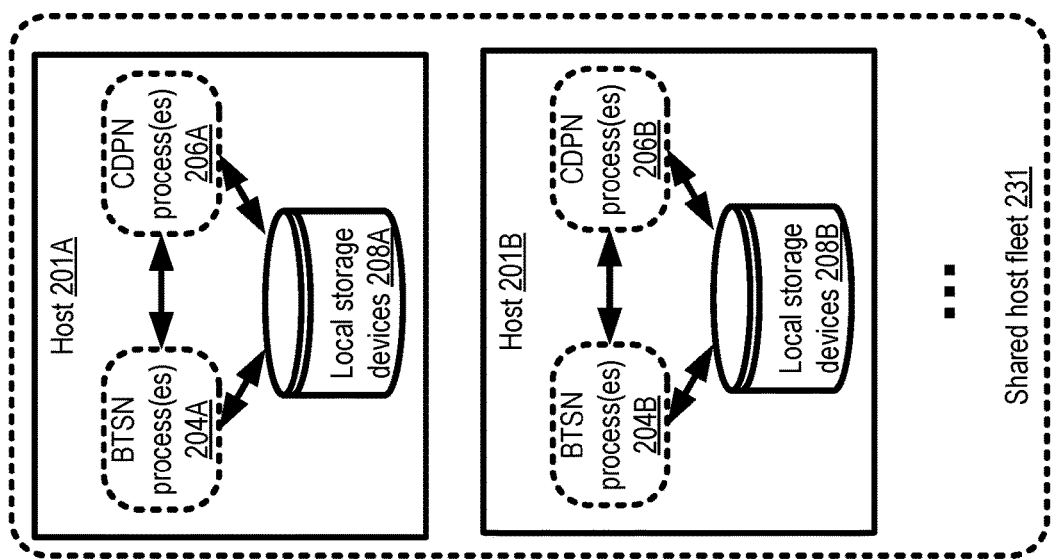

As indicated earlier, in some embodiment each base table storage node (BTSN) and continuous data protection node (CDPN) may comprise one or more processes or threads of execution. FIG. 2a and FIG. 2b illustrate respective examples of different approaches for hosting base table storage node processes of a distributed database and continuous data protection processes of the distributed database, according to at least some embodiments. In FIG. 2a, a shared host fleet 231 may be employed at the database service, comprising a plurality of hosts 201 (e.g., 201A or 201B). Each host 201 may include local storage devices 208, such as storage devices 208A at host 201A and local storage devices 208B at host 201B, at which contents of base tables and/or other database artifacts may be stored. In the shared-host approach of FIG. 2a, one or more CDPN processes 206 may be instantiated at the same host as one or more BTSN processes 204. For example, host 201A includes BTSN processes 204A and CDPN processes 206A, while host 201B includes BTSN processes 204B and CDPN processes 206B.

In the approach illustrated in FIG. 2b, separate host fleets may be used for BTSNs and CDPNs. For example, BTS host fleet 235 includes hosts 251A and 251B, while CDP host fleet 237 includes hosts 252A and 252B. Each host comprises respective processes and local storage dedicated to fleet-specific purposes—e.g., host 251A includes BTSN processes 254A and local storage devices 258A, host 251B includes BTSN processes 254B and local storage devices 258B, host 252A includes CDPN processes 262A and local storage devices 268A, and host 252B includes CDPN processes 262B and local storage devices 268B.

The approaches shown in FIG. 2a may represent different tradeoffs with respect to hardware costs, network utilization, scalability independence, and/or performance impacts of CDP-related workloads on client I/O requests. In general, all other factors such as workloads remaining roughly equal, more hosts may be required for the approach shown in FIG. 2b than the approach of FIG. 2a, for example, which may translate to higher hardware costs. If a storage service or some other network-connected repository is used for snapshots as discussed in the context of FIG. 1, the shared-host approach of FIG. 2a may require less overall network data transfer. For example, when creating snapshots, the CDPNs 206 may be able to read base table contents from local storage devices 208, and transfer the contents once over a network to the storage service.

In contrast, in the split-host approach of FIG. 2b, base table contents may have to be transferred twice over a network (once from the BTSN host to the CDPN host, and then from the CDPN host to the storage repository). Of course, co-locating CDPN processes with BTSN processes (as in FIG. 2a) may result in higher impact on base table I/O request performance than if the two types of processes are segregated at respective hosts (as in FIG. 2b). Also, it may be possible to scale the number of hosts for base table operations independently of the number of hosts used for CDP operations in the split-fleet approach of FIG. 2b. In some embodiments, the database may evolve from one architecture to the other—for example, initially the shared-fleet approach may be used for at least some tables, and later the CDPNs may be transitioned to a different host fleet if the results achieved using the shared-fleet approach are found to be inadequate.

Base Table Parameters and Partitioning

Figure 3:
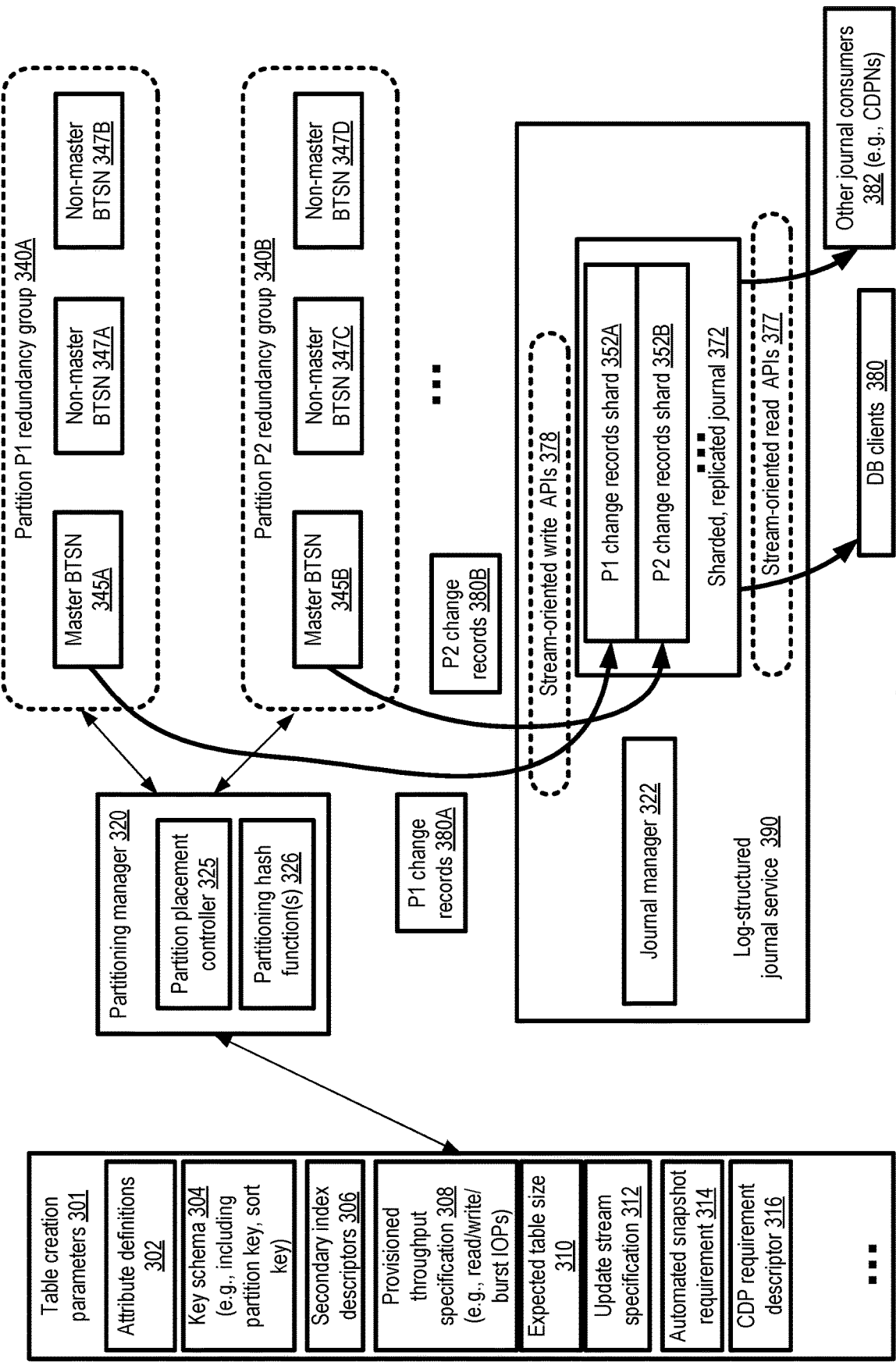
FIG. 3 illustrates an example of partitioning of base tables and corresponding change records of a distributed database, according to at least some embodiments.

FIG. 3 illustrates an example of partitioning of base tables and corresponding change records of a distributed database, according to at least some embodiments. In the depicted embodiment, a table creation request may be submitted by a database service client. The request may indicate a table name and comprise some subset or all of the table creation parameters 301, such as attribute definitions 302, a key schema 304, one or more secondary index descriptors 306, a provisioned throughput specification 308, an expected table size 310, an update stream specification 312, automated snapshot requirement 314 and/or a CDP requirement descriptor 316 in the depicted embodiment. Other parameters may be included in some embodiments, such as a target budget limit, non-default data durability requirements, non-default availability requirements, and the like.

The names and/or data types (e.g., numeric, binary, or string) of various table attributes or columns may be indicated in attribute definitions 302. The key schema 304 may specify which subset of the attributes is to be used as the primary key for the table. In some embodiments, a particular primary key attribute may be indicated as the partition attribute of the table in the key schema. Values of the partition attribute of a table record or row may be provided as input to one or more hash functions, for example, and the output of the hash functions may be used to identify the particular partition to which the record or row belongs. In some embodiments, the key schema may include (e.g., in addition to the partition attribute) one or more sort attributes, whose values may be used to order the storage locations of different rows with the same partition key value. Similar key schemas may be specified for each secondary index in some embodiments. Other arrangements for specifying table and/or index keys may be used in different embodiments.

In some embodiments the database service may support the establishment of multiple global secondary indexes (GSIs) for a given table. Details about the desired GSIs may be included in the secondary index descriptors 306, such as the respective index names, GSI key schemas, the set of base table attributes which are going to be projected to (i.e., materialized at) the GSI, and/or the provisioned throughput requirements for the GSIs. Additional details regarding the manner in which GSIs may be created and updated using change records stored in a log-structured journal are provided below.

The provisioned throughput specification 308 may indicate the desired rate at which sustained client-submitted reads and/or writes (e.g., expressed in IOPS or I/O operations per second) are to be supported by the database service for the table. In some embodiments, a respective IOPS measure may be provided for reads and writes. In at least one embodiment, a client may also provide some indication of anticipated burst-mode behavior—e.g., in addition to indicating the sustained IOPS to be supported, the database service may also be informed that the client's workload may include short-term bursts above the sustained IOPS. In various embodiments, the database service may allocate resources for the table in such a way that the provisioned throughput levels can be guaranteed (with some caveats, for example, for unusual failure scenarios), while the burst mode workloads above the provisioned throughput levels may be handled on a best effort basis. In one embodiment in which burst mode workloads are supported on a best-effort basis, for example, a certain level of excess resource capacity may be provisioned to deal with occasional bursts, but that excess resource capacity may occasionally be used for purposes such as continuous data protection or GSI management. For example, during time periods in which a new GSI is being created or a snapshot is being generated, burst mode work requests (i.e., I/O requests representing throughputs above the provisioned throughput levels) may be rejected. An expected table size parameter 310 may be included in a table creation request in some embodiments, indicating the targeted maximum size of the table.

The provisioned throughput specification 308 and/or the expected table size parameter 310 may be used to determine the number of partitions into which the table is to be subdivided in the depicted embodiment. For example, each partition may have a maximum sustainable throughput and/or a maximum size, constrained by the types of resources available for the base table storage nodes at which the partition is going to be stored. The secondary index descriptors 306 may include respective provisioned throughput specifications for individual indexes in some embodiments, which may be used to determine the number of partitions of each index.

An update stream specification 312 may be included in a table creation request to indicate that the client wishes to be able to access change records of the table via a stream-oriented API of the kind supported by the log-structured journal service discussed in the context of FIG. 1. An automated snapshot requirement 314 may be included in the table creation parameters to indicate that the client desires a sequence of snapshots of the table to be generated based on specified triggering conditions. In the depicted embodiment, the client may also include a CDP requirement 316 indicating various details regarding various properties of the continuous data protection desired for the table being created. Such properties may include, for example, the granularity at which a restoration target time may be specified (e.g., whether restores are to be generated for specified minute boundaries, hour boundaries, etc.), a goal for the maximum restore response time (e.g., how quickly a given restore request is to be fulfilled by the service, etc.), how long the time window for point-in-time restores should be (e.g., whether a client wants to be able to restore the table to any time in the last month, the last week, or the last day), and the like. Several of the parameters 302 may be optional in various embodiments—e.g., in one embodiment, a client may only have to specify the key schema for a primary key, the attribute definitions, and a desired provisioned throughput.

At least some of the client-specified parameters associated with a given table may be satisfied using a log-structured journal in various embodiments. For example, change records may be propagated to such a journal if the client request includes an update stream specification 312, a secondary index descriptor 306 for a GSI, or a CDP requirement 316. In various embodiments, update stream support, the creation of one or more GSIs, automated snapshot generation and/or the enablement of continuous data protection may be requested after the table has already been created. For example, a database service client may request the creation of a table Table1 without update streams, GSIs, automated snapshots or CDP at time T1. Later, at time T1+delta1, continuous data protection may be requested for the table; at time T1+delta1+delta2, a request to create a new GSI may be submitted, and so on. The same journal may be used to fulfill several different functional requirements in some implementations—e.g., an update stream request may be satisfied using the same log as is being used for CDP, a GSI may be maintained using the same log as is being used for CDP and/or an update stream, and so on. Similarly, in one embodiment, if a client has requested automated snapshots for a table, some of those snapshots may be used for CDP and/or for GSI creation.

In the embodiment depicted in FIG. 3, a partitioning manager 320 (e.g., part of the control-plane of the distributed database) may determine the number of partitions into which the base table is to be divided (e.g., based on the provisioned throughput and/or expected size of the table) using one or more hash functions 326 applied to the partition key. For each partition, a partition placement manager 325 may identify a redundancy group 340 of base table storage nodes. For example, redundancy group 340A for partition P1 of the table includes a master BTSN 345A and a pair of non-master BTSNs 347A and 347B, while redundancy group 340B for partition P2 of the table includes master BTSN 347B and non-master BTSNs 347C and 347D. The nodes of a redundancy group may be physically distributed in such a way that the probability of multiple node failures within the redundancy group is minimized, as discussed below in further detail in the context of FIG. 9. In some embodiments, the master BTSN of a redundancy group 340 for a partition may be responsible for ensuring that a write to the partition has been saved at persistent storage at some minimum number of BTSNs of the redundancy group before the response to the corresponding write request is provided. Reads may be satisfied from any of the members of a redundancy group in some embodiments. In the event of a failure of a given master BTSN (or due to other triggering conditions such as excessive clock skew as discussed below), master responsibilities for the partition may be failed over to a non-master BTSN of the redundancy group in various embodiments.

In the depicted embodiment, change records for each partition of a table may be transmitted from the master BTSN 345 for that partition to the journal service 390. For example, master BTSN 345A may submit change records 380A containing pre-images and post-images for each committed write of partition P1 to journal manager 322 via stream-oriented write APIs 378. Similarly, partition P2's change records 380B may be transmitted by master BTSN 345B to the journal manager. The journal 372 may be organized as a collection of logical sub-units called shards in the depicted embodiment, with each table partition being mapped to a particular shard at a given point in time. Thus, for example, change records 380A of partition P1 may be appended to shard 352A, while change records 380B of partition P2 may be appended to shard 352B. Each shard 352 in turn may be chain-replicated at a plurality of storage devices as discussed below in further detail. Stream-oriented read APIs 377 may be used by database clients 380 (e.g., clients that requested an update stream to be configured for the base table) and/or other journal consumers such as CDPNs 382 in the depicted embodiment. Metadata indicating the mapping between partitions and shards may be stored by the database service control-plane in some embodiments, enabling the appropriate shards to be identified for reads and writes directed to the journal 372. Journal contents may be replicated at several nodes as described in further detail below.

It is noted that a given table may sometimes comprise a single partition, e.g., based on a low provisioned throughput or a small maximum size. In much of the remainder of this description, to help simplify the presentation, some of the operations illustrated on a per-partition basis in FIG. 2 may be discussed as though the corresponding table comprised a single partition—that is, partition-level details may not necessarily be provided even though the operations may be performed separately with respect to each partition. Each of the services involved may comprise respective subcomponents responsible for generating the appropriate partition-level commands or operations to respond to a table-level request (e.g., a CDP enablement request, a snapshot generation, a restore request, a GSI creation request, etc.), and to aggregate the partition-level results into a table-level result if needed.

Snapshot Generation and Change Record Logging for Continuous Data Protection

Figure 4:
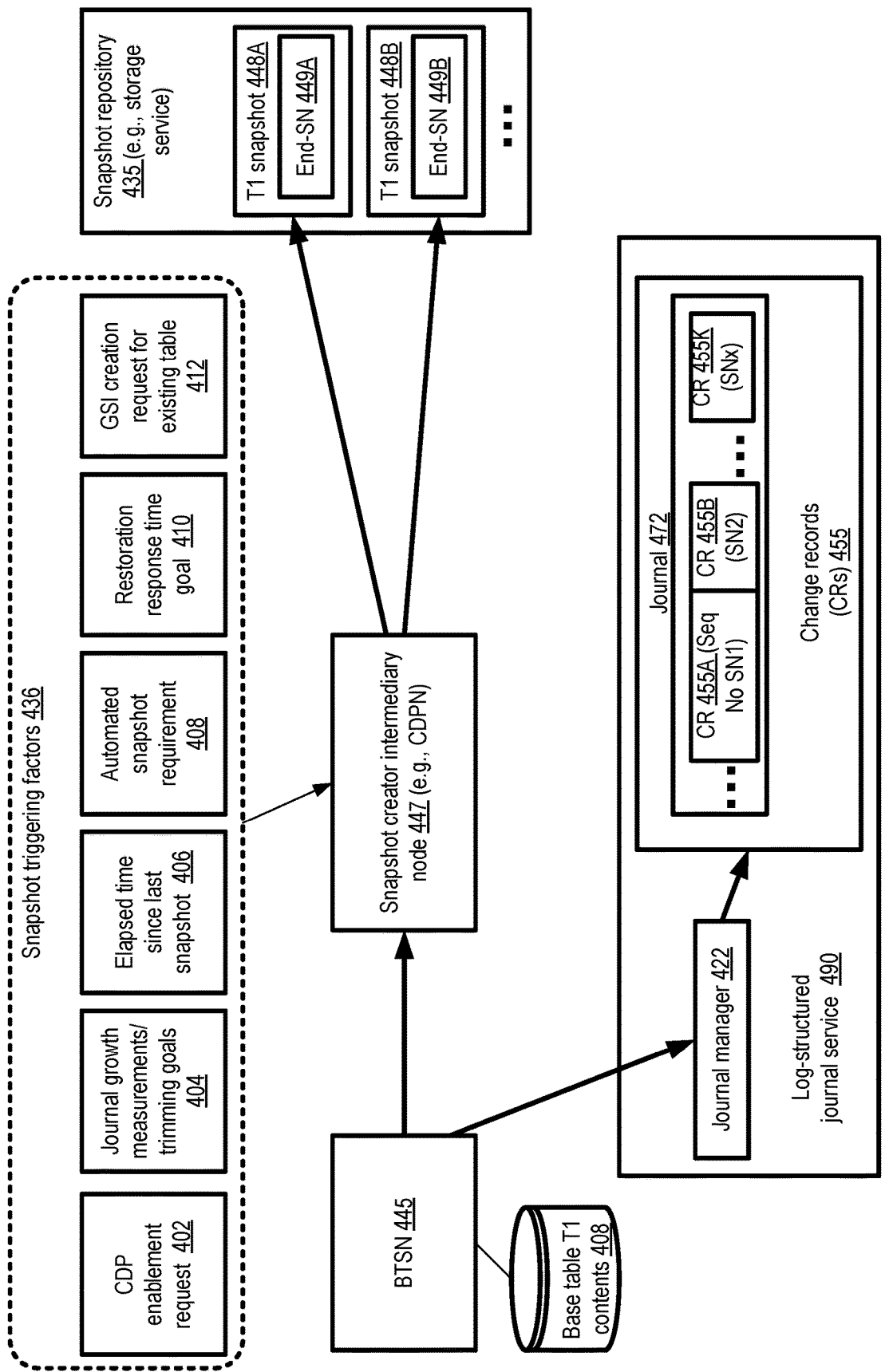
FIG. 4 illustrates example factors which might trigger the generation of automated snapshots of a base table, according to at least some embodiments.

In various embodiments, snapshots or copies of base tables may be created for various reasons, for example to help speed up point-in-time restore operations, to create GSIs for tables that have pre-existing unindexed data, and so on. FIG. 4 illustrates example factors which might trigger the generation of automated snapshots of a base table, according to at least some embodiments. As shown, in the depicted embodiment a BTSN 445 may be responsible for storing contents 408 of a base table T1. Change records indicative of committed writes to the base table T1 may be submitted by the BTSN 445 to journal manager 422 of journal service 490. The change records 455 (e.g., 455A, 455B and 455K) accepted by the journal manager 422 may be appended to journal 472, e.g., with a respective commit sequence number (SN) indicative of the order in which the records are approved by the journal manager. Some change records may be rejected because they have been found to be duplicates of earlier-inserted records, for example. In one embodiment, the journal manager may implement an optimistic concurrency control protocol, in which a new record may be approved for inclusion in the journal if and only if read-write conflicts are not detected with respect to one or more previously-appended journal records 455 by the journal manager.

A combination of one or more triggering factors 436 may result in the copying of the table contents from the BTSN 445 to one or more storage devices of a snapshot repository 435 (e.g., a storage service of the kind discussed in the context of FIG. 1) by a snapshot creation intermediary node (e.g., a CDPN or a node associated with secondary index storage management). Any desired type of storage repository may be used for base table snapshots in different embodiments.

A sequence of snapshots 448 (e.g., 448A or 448B) may be initiated in response to a request 402 to enable CDP for the base table T1 in some embodiments. A given snapshot 448 may include information about the last (most recent) write incorporated in it, e.g., in the form of the sequence number (end-SN 449, such as end-SN 449A or 449B) corresponding to the change record for the last write which was stored in the journal 472 and also represented in the snapshot. The end-SNs may be considered logical representations of the creation time of the snapshots 448 in some embodiments—that is, change record sequence numbers may be used as logical timestamps.

In various embodiments, some snapshots 448 may be generated to limit the growth of the journal 472. In high-throughput environments, millions of write-containing transactions may be committed every day to a given base table, and the size of the log 472 may grow to unmanageable levels if all the change records have to be preserved indefinitely. To avoid such unrestricted log growth, older change records may be trimmed from the journal 472 in the depicted embodiment. For example, after a snapshot 448A which incorporates all the changes up to a particular sequence number end-SN 449A has been stored, and/or after all the journal consumers which have been configured have examined entries with sequence numbers up to end-SN 449A, some number of change records with sequence numbers smaller (i.e., generated earlier) than end-SN may be trimmed. In different embodiments, various thresholds with regard to journal growth measurements and/or trimming goals 404 may result in the creation of new snapshots. In some implementations, the time 406 that has elapsed since the most recent snapshot was created may be used as an approximate indicator of log growth, and new snapshots 448 may be created at regularly-spaced time intervals.

As mentioned earlier, in some embodiments database clients may request the generation of automated snapshots, and client-specified automated snapshot requirements 408 may trigger exactly when a new snapshot is created. Some clients may specify that a snapshot should be created once every day, for example, or when the table's row count increases by X, or based on other thresholds. With respect to tables for which CDP has been enabled, in some embodiments the restoration response time goal 410 (i.e., a targeted maximum time to complete any given point-in-time restore operation) may drive the generation of new snapshots 448. For example, if one client C1 wants to be able to generate a point-in-time restore within one hour, while client C2 is willing to let a restore take two hours, more frequent snapshots may be scheduled for client C1 than client C2 (assuming the tables involved have approximately the same provisioned throughputs and sizes). In some embodiments as discussed below, a request 412 to create a new global secondary index for a table which already exists (and has data in it) may trigger the creation of a new snapshot 448. In embodiments in which snapshots are created on a per-partition basis, metadata indicating the mappings between partitions and snapshots (and/or the ending change record sequence numbers associated with snapshots) may be maintained by control-plane components of the database service as mentioned earlier. Together with partition-to-journal-shard mapping metadata, such snapshot metadata may be used to orchestrate table-level restores in various embodiments.

Figure 5:
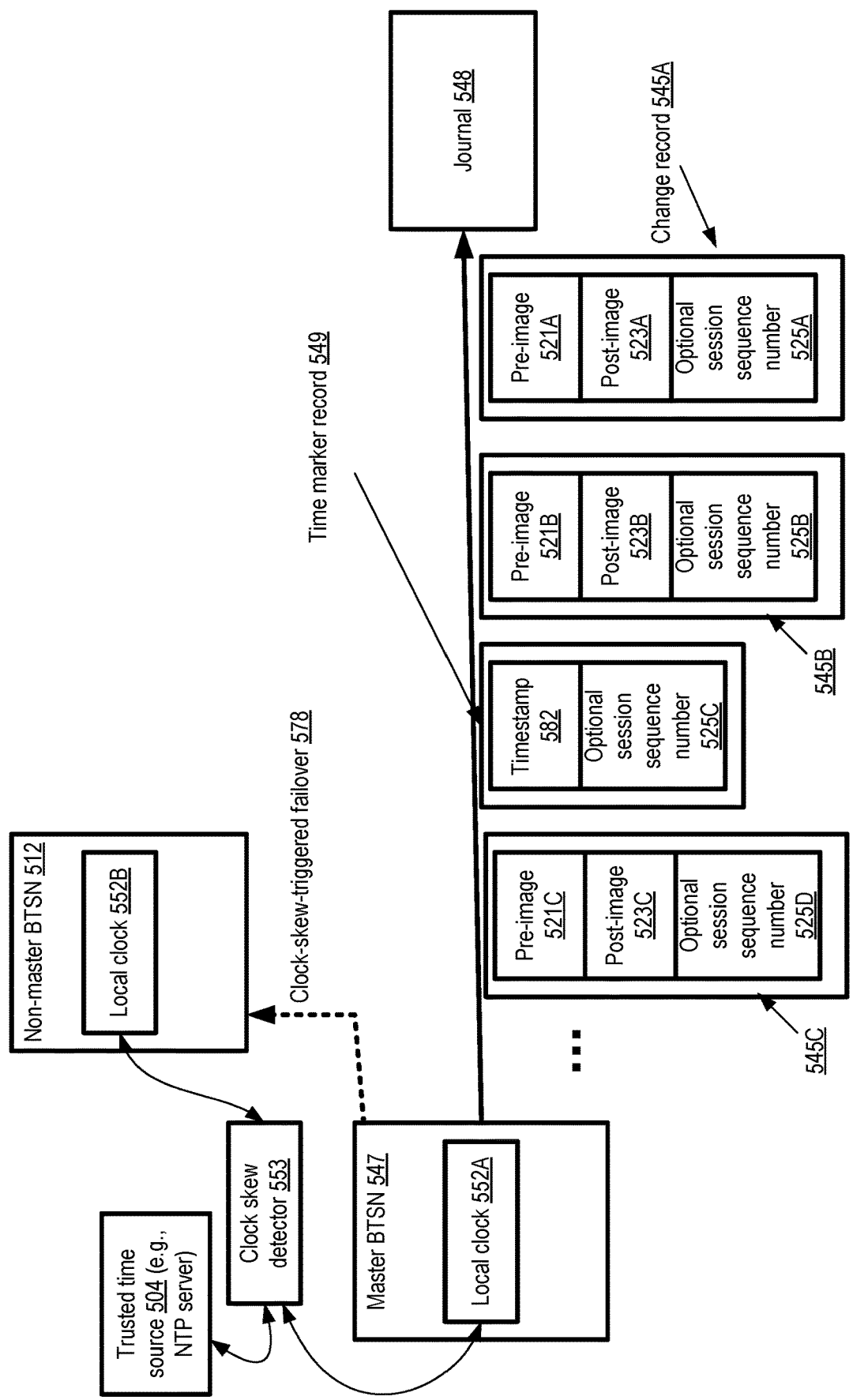
FIG. 5 illustrates examples of the kinds of records which may be appended to a log-structured journal, according to at least some embodiments.

FIG. 5 illustrates examples of the kinds of records which may be appended to a log-structured journal, according to at least some embodiments. In the depicted embodiment, a master BTSN 547 submits change records 545 (e.g., 545A, 545B and 545C) interspersed with periodic time marker records 549 for inclusion in the journal 548. A given time marker record 549 may include a timestamp 582 based at least in part based on a local clock 552A of the master BTSN 547 and a time marking interval parameter (e.g., a parameter which specifies that time marker records should be generated once every T seconds). As mentioned earlier, sequence numbers assigned by the journal manager (which may in turn be based at least in part on optional session-sequence numbers 525 included in the submitted records by the BTSN) may be used as logical timestamps indicating the order in which records were processed at the journal manager. In embodiments in which database clients may specify restoration target times in wall-clock units, a mapping between wall-clock times and sequence numbers may be helpful. The time marker records 549 may be useful in identifying which change records were inserted or submitted during specified wall-clock time periods. For example, if a time marker record 549 is submitted every minute, this may enable a journal consumer (e.g., a CDPN) to efficiently identify the respective set of changes which were committed to the table at minute-level granularity. All the change records 545 which appear in the journal between time markers for 17:00 on a particular and 17:01 may be assumed to have been submitted for writes requested within (or shortly before) that one-minute period, for example. Each change record 545 may include the respective pre-image 521 and post-image 523 for the corresponding committed write. Thus, in order to create a restore-result table which incorporates the writes performed up to 17:01 in the above example, a CDPN may be able to apply the change records for the time period ending at 17:01 sequentially to a selected snapshot as described below.

In some embodiments, the local clock 552 of a given BTSN may deviate from the "true" local time for various reasons. In the depicted embodiment, a clock skew detector 553 may determine, e.g., using an external trusted times source 504 such as a network time protocol (NTP) server, the extent to which the local clock at the master BTSN 547 has deviated from the correct local time. In order to be able to support point-in-time restores with a desired level of accuracy, clock skews above a threshold level at a master BTSN may result in failovers in the depicted embodiment. For example, as a result of detecting that the local clock has deviated too far from the trusted time source 504, the functions of the current master BTSN node 547 may be failed over to non-master BTSN 512—that is, failover 578 may result in the master BTSN role being assigned to node 512 instead of node 547. Node 547 may be rebooted or other approaches may be taken to try to resolve its excessive clock skew in various embodiments. If the time skew cannot be resolved for node 547, it may be taken offline and replaced by a new BTSN in the depicted embodiment.

Figure 6:
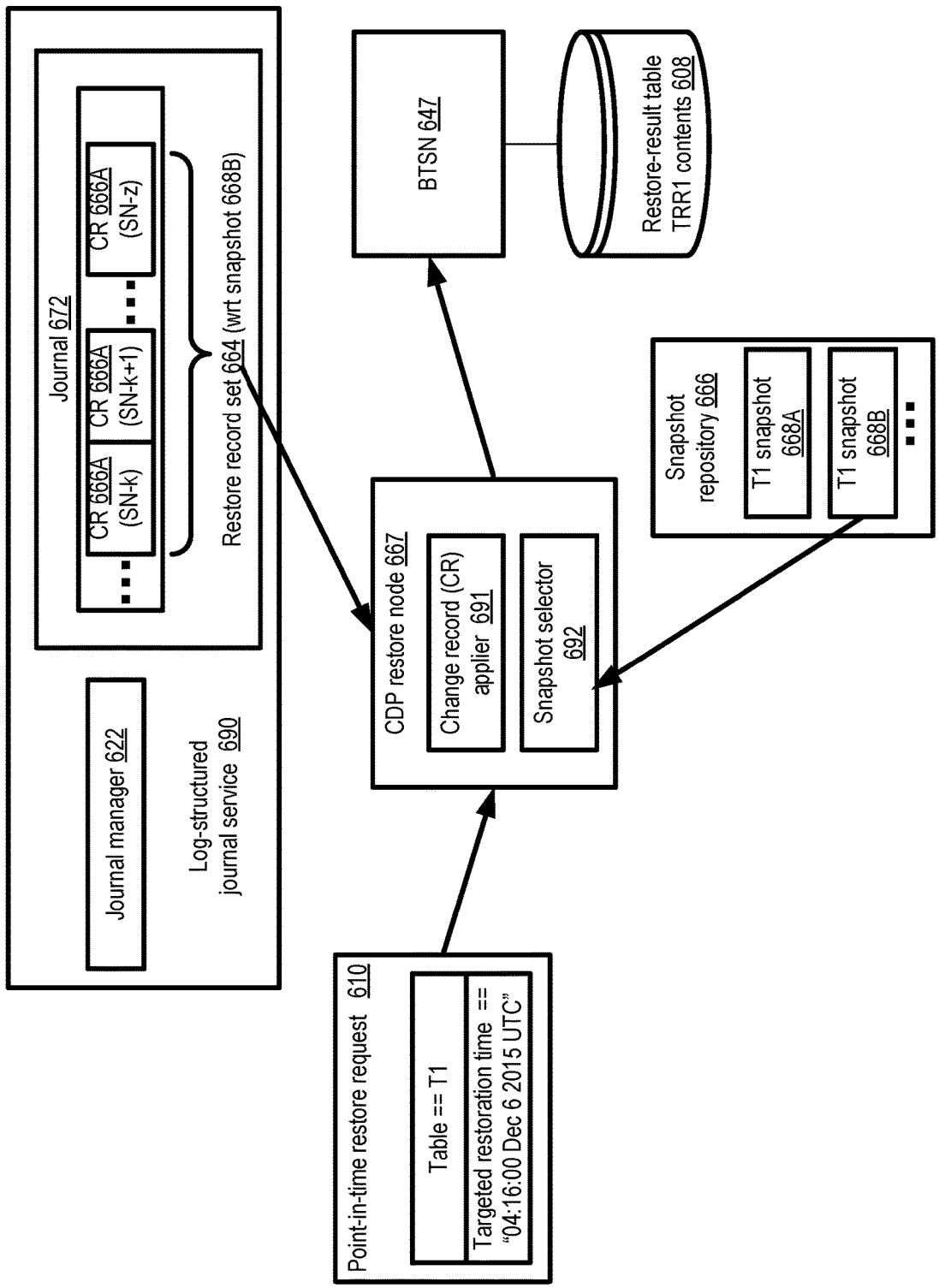
FIG. 6 illustrates the generation of a restore result table using a selected snapshot and a subset of change records of a log-structured journal, according to at least some embodiments.

FIG. 6 illustrates the generation of a restore result table using a selected snapshot and a subset of change records of a log-structured journal, according to at least some embodiments. In the depicted embodiment, a client submits a point-in-time restore request 610 for a base table T1, with a targeted restoration point-in-time of 4:16 AM on Dec. 6, 2015 to the database service. In response to the request, a CDPN configured as a restore node 667 identifies a particular snapshot 668B of T1 as the best candidate snapshot for the restore. For example, the snapshot creation time of each of the available snapshots may be examined by snapshot selector 692, and the particular snapshot that was created closest to (and before) the targeted restoration time may be selected as the one to be used for the restore. In embodiments in which change record sequence numbers are used as snapshot creation time indicators, the time marker records inserted in the journal may be used to identify the base snapshot.

After the base snapshot has been selected based on its creation time relative to the targeted restoration time, a restore record set 664 may be identified from the journal 672 implemented at service 690 with the help of journal manager 622 and the inserted time marker records in the depicted embodiment. The restore record set 664 may represent all those writes that (a) are to be incorporated in the restored table and (b) are not represented in the base snapshot 668B. The changes indicated in the restore record set 664 may be applied to the base snapshot 668B (e.g., in increasing sequence number order by CR applier 691), and the resulting restore-table contents 608 may be stored at one or more selected BTSNs 647. Depending on whether the client wishes to overwrite the existing base table, or create a new base table with the restoration results, different BTSNs may be used for the restore-result table than were used for the original base table in various embodiments.

Journal Service Subsystems

Figure 7:
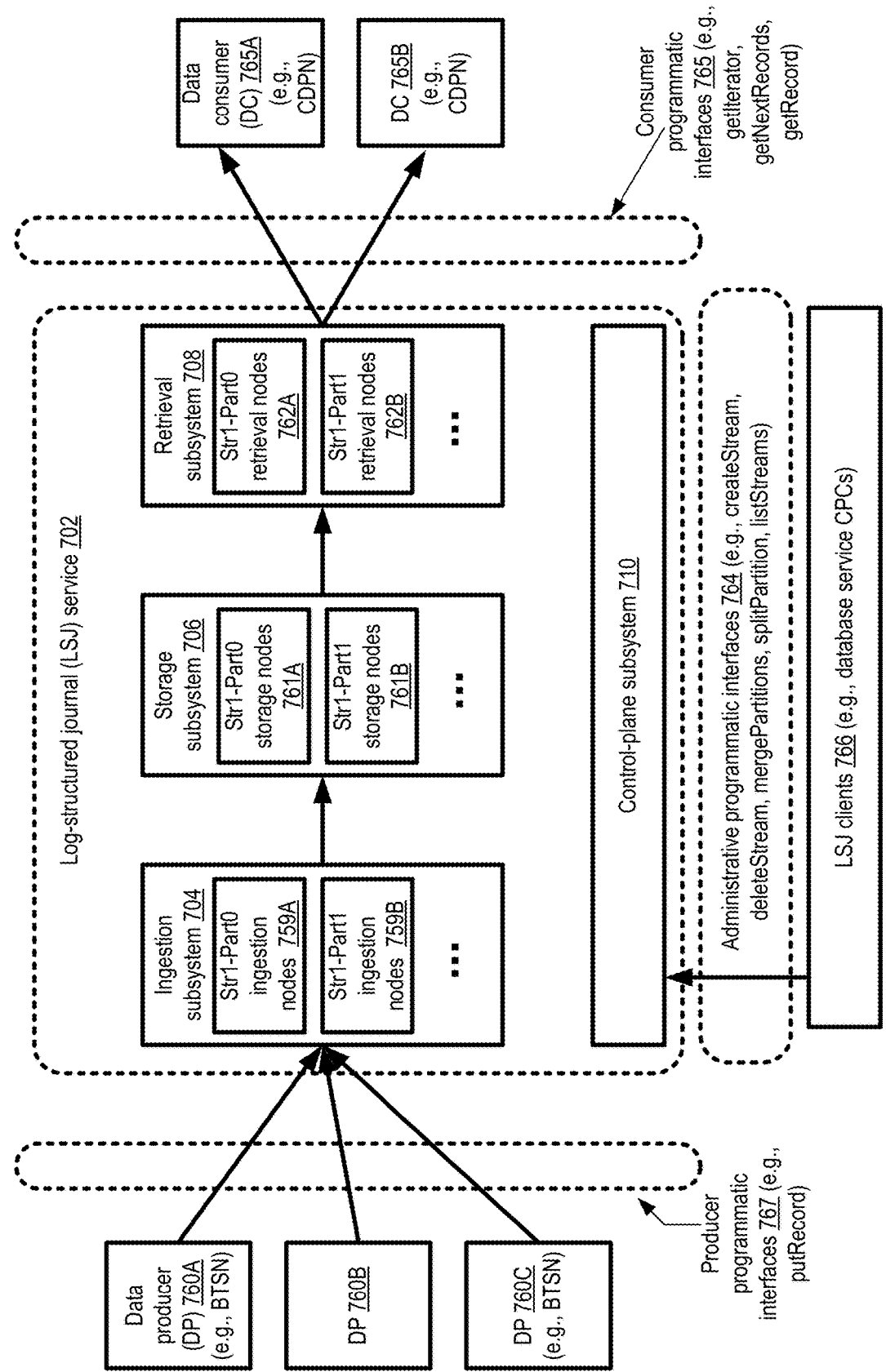
FIG. 7 illustrates example subsystems of a log-structured journal service which implements stream-oriented programmatic interfaces, according to at least some embodiments.

In various embodiments, a scalable layered architecture may be implemented for a log-structured journal service of the kind discussed above, with respective subsystems for receiving, storing and providing read access to journal contents which can be scaled and administered independently of one another. FIG. 7 illustrates example subsystems of a log-structured journal service which implements stream-oriented programmatic interfaces, according to at least some embodiments. Such a service may also be referred to as a stream management service as mentioned above. As shown, the log-structured stream-oriented journal service 702 may comprise an ingestion subsystem 704, a storage subsystem 706, a retrieval subsystem 708, and a control-plane subsystem 710. In some embodiments, the journal manager described earlier may comprise portions of some or all of the subsystems shown in FIG. 7—that is, the journal manager may be implemented using a plurality of components distributed among the ingestion, storage, retrieval and control-plane subcomponents. In general, the log-structured journal service may be used by a variety of clients for respective applications in a provider network environment, and not just for storing change records associated with writes directed to a database service. In some embodiments, for example, the log-structured journal service may enable clients to submit streaming data records from numerous data sources external to the provider network (such as sensors of various types), store that data with high durability and availability, and analyze the data in real time or in a batch mode.

Generally speaking, each of the subsystems 704, 706, 708 and 710 may include one or more nodes or components, implemented for example using respective executable threads or processes instantiated at various servers or hosts of a provider network. Nodes of the ingestion subsystem 704 may be configured (e.g., by nodes of the control subsystem 710) to obtain or receive data records of a particular data stream, such as change records pertaining to a particular table, from data producers 760, and each ingestion node may pass received data records on to corresponding nodes of the storage subsystem 706. Data producers 760, such as 760A-760C, may include base table storage nodes (BTSNs) of a distributed database service in some embodiments. The storage subsystem nodes may save the data records on any of various types of storage devices (e.g., solid-state drives (SSDs), rotating magnetic disk-based devices, or volatile memory devices) in accordance with a persistence policy selected for the stream. Nodes of the retrieval subsystem 708 may respond to read requests from data consumers such as 765A or 765B (which may include, for example, continuous data protection nodes (CDPNs) of the database service, or change propagator nodes established for global secondary indexes of the database service).

As discussed earlier in the context of change records submitted for a given database table, a stream may be subdivided into partitions (which may also be referred to as shards) in some embodiments. In the depicted embodiment, respective sets of one or more nodes may be designated for each partition of a stream at the ingestion subsystem, the storage subsystem and the retrieval subsystem. For example, ingestion nodes 759A may be set up for partition 0 of stream 1 ("Str1-Part0"), ingestion nodes 759B may be set up for partition 1 of stream 1 ("Str1-Part1"), and so on. Similarly, one or more storage subsystem nodes 761A may be set up for Str1-Part0, storage subsystem nodes 761B may be designated for Str1-Part1, and so on. Respective sets of retrieval nodes 762A and 762B may be set up for Str1-Part0 and Str1-Part1 as well. Similar sets of resources at each subsystem may be established for other streams and other partitions of the stream.

In the embodiment depicted in FIG. 7, clients 766 (such as control-plane components of the database service) may utilize one or more sets of administrative programmatic interfaces 764 to interact with the control-plane subsystem 710. Similarly, data producers 760 may use producer programmatic interfaces 767 to submit data records, and data consumers may use consumer programmatic interfaces 765 to read the stored records. A few specific examples of APIs (application programming interfaces) that may be used for submitting stream data records, retrieving stored stream data records and/or requesting administrative operations in various embodiments are also shown in FIG. 7. For example, data producers 760 may use a "putRecord" API to submit a data record into a specified stream (or a specified partition of a specified stream). In at least some embodiments, a sequencing indicator (such as a sequence number) may be associated with each data record that is stored by the SMS, and the records of a given stream may be retrievable either in sequence number order or in random order. A "getIterator" API may be used by a data consumer to indicate a starting position or starting sequence number within a stream or partition in the depicted embodiment, and a "getNextRecords" API may be used to retrieve records in sequential order from the iterator's current position. A "getRecord" API may also be supported in the depicted embodiment, e.g., for random accesses that do not require iterators to be established. Control-plane or administrative APIs may include, for example, "createStream" (to establish a new stream), "deleteStream" (to remove an existing stream), "listStreams" (to obtain a collection of streams that the requester is authorized to view), "mergePartitions" to combine two specified partitions, and "splitPartition" to subdivide a given partition. Other stream-oriented APIs than those shown in FIG. 7 may be employed in different embodiments. It is noted that programmatic interfaces other than APIs (e.g., web pages such as web-based consoles, graphical user interfaces and/or command-line tools) may be used in at least some embodiments.

Figure 8:
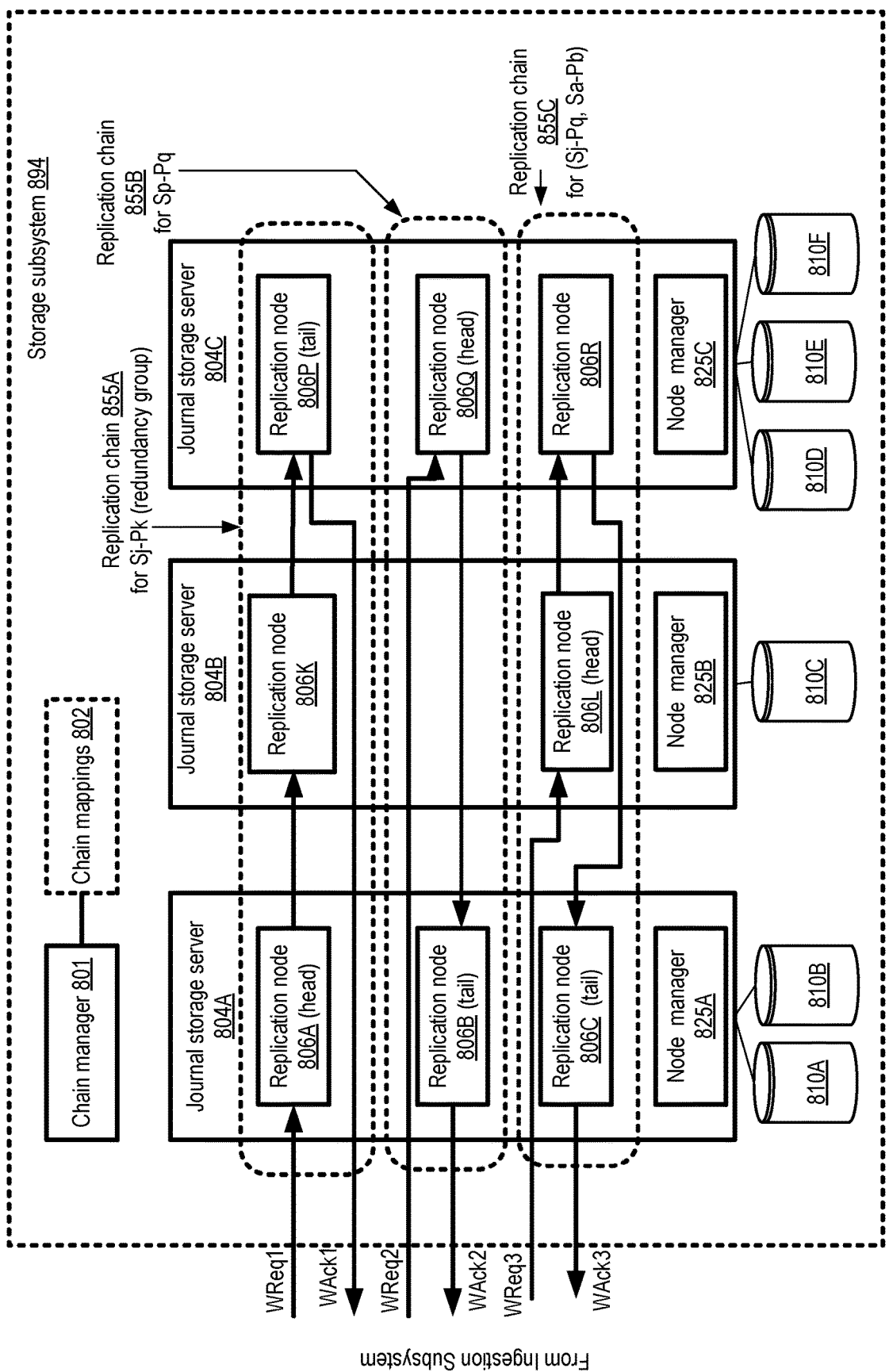
FIG. 8 illustrates examples of replication chains which may be implemented at a storage subsystem of a log-structured journal service, according to at least some embodiments.

In at least one embodiment, an approach employing sequential or "chained" replication of stream data records at a plurality of storage subsystem nodes may be used, in which for example relatively inexpensive commodity disks of the storage subsystem nodes may be used to efficiently attain a high degree of data durability. FIG. 8 illustrates examples of replication chains which may be implemented at a storage subsystem of a log-structured journal service, according to at least some embodiments. A chain manager 801 may be configured in such embodiments to determine, for a given stream partition such as Sj-Pk, a mapping 802 of the stream's data to a selected set of storage destinations at which copies of the partition's data records are to be created in sequential order. In at least some implementations the chain manager 801 may be implemented as a component of a control-plane subsystem of the journal service (e.g., as part of the journal manager discussed earlier). Reflecting the sequential or chained nature of the replication, the mappings 802 may be referred to herein as "chain mappings". Each partition may be assigned a replication chain 855 (e.g., 855A or 855B), comprising some number of replication nodes 806 that are responsible for generating the replicas. A replication node 806 may, for example, comprise a process or thread of execution at a journal storage server 804, and may be granted write permission to one or more storage devices 810 employing any of various types of non-volatile storage technologies and accessible from the storage server 804. Different replication chains may comprise different numbers of replication nodes in at least some embodiments, e.g., based on the data durability requirements of the corresponding partitions. A replication chain may be assigned to more than one partition (potentially of more than one stream) in some implementations. The chain mappings 802 generated by chain manager 801 may comprise information on a number of different types of potentially dynamically modifiable relationships: the replication chain currently assigned to a given partition, the journal storage servers assigned to a given replication chain, the roles (e.g., head node, intermediate node, or tail node, described below in further detail) assigned to replication nodes of a given chain, and/or the storage device(s) at which a given replication node is to write data records.

In the example scenario depicted in FIG. 8, three replication chains—855A, 855B and 855C—are shown in a journal storage subsystem 894. Replication chain 855A, configured for partition Sj-Pk (the kth partition of stream Sj), comprises three replication nodes: replication node 806A on journal storage server 804A, replication node 806K on journal storage server 804B, and replication node 806P on storage server 804C. Node 806A is currently designated the "head" of the replication chain 855A, while node 806B is currently designated the "tail" of the replication chain 855A.

The head of a given replication chain may be configured to receive write requests (as indicated by the arrow labeled WReq1 in the case of node 806A) for a given partition's data records from an ingestion subsystem node. For example, in one embodiment an ingestion subsystem node may receive a data submission request of partition Sj-Pk from a data producer, optionally perform de-duplication checking and/or other acceptance checking as described earlier, determine (if it is not known already) the identity or address of a head node 806A or replication chain 855A from chain manager 801, and then submit a corresponding write request WReq1 to the head node 806A. After receiving the write request, the head node may store a local copy of the data to a storage device accessible from the head node's storage server, e.g., to one or more of local storage devices 810A or 810B in the case of head node 806A at storage server 804A. After storing the local replica, the head node 806A may transmit or forward a write request for the data record to the next replication node in the replication chain, such as replication node 806K.

The sequential order in which the data records of the partition are to be replicated, starting from a head node, passing through zero or more intermediate nodes, and ending at a tail node, may be defined by the chain manager 801 as part of the chain mapping 802. For some partitions that may not require very high data durability, a single-node replication chain may be defined in some implementations, in which separate head and tail nodes are not defined. Each node in the chain may receive a write request, and store a local replica of the corresponding data records. All the nodes except for the tail node may transmit or forward a write request to the next node in the chain; in at least some implementations, such write requests may serve as acknowledgements that the nodes have completed their local writes successfully. The tail node, after storing its replica, may transmit a write acknowledgement (e.g., WAck1 from tail node 806P of replication chain 855A) to the ingestion subsystem, indicating that the data record has been successfully stored in accordance with the applicable policies for the partition. As a result of replicating the data record in sequential order as described above, at least some level of workload balance may be achieved automatically among the different replication nodes of a chain—e.g., for a given data record submitted to the ingestion subsystem by a data producer, each node in the chain may receive one incoming message, perform one storage operation, and transmit one outbound message (either a write request or, in the case of the tail node, a write acknowledgement). Upon receiving the write acknowledgement from the tail replication node, in some embodiments the ingestion subsystem may provide a response to the data producer that submitted the data record, indicating that the data has been added or ingested to the stream.

Replication chains 855A and 855C each comprise three replication nodes in FIG. 8, while replication chain 855B comprises two replication nodes. In each of the illustrated replicas chains, different nodes are designated as head nodes and tail nodes. For replication chain 855B configured for partition Sp-Pq, node 806Q is designated as the head node configured to receive write requests WReq2 from the SMS ingestion subsystem, and node 806B is designated as the tail node configured to transmit write acknowledgements WAck2 to the ingestion subsystem. Replication chain 855C is configured to store data records for two partitions of different streams—partition Sj-Pq and Sa-Pb. For replication chain 855C, node 806L on storage server 804B is the head node, configured to receive write requests WReq3 of partitions Sj-Pq and Sa-Pb from the ingestion subsystem, while node 806C at storage server 804A is the tail node responsible for sending write acknowledgements WAck3. Replication nodes that are currently designated neither as head nodes nor as tail nodes, such as replication node 806K or 806R, may be referred to as intermediate nodes of their replication chains. In some embodiments, a given replication node may serve a plurality of roles—e.g., it may be a head node for one partition, a tail node for another partition, and/or an intermediate node for a different partition. As mentioned above, for some partitions a replication chain comprising only a single node may be configured, combining the head node functionality (receiving the initial write request for a data record from the ingestion subsystem) and the tail node functionality (transmitting a write acknowledgment to the ingestion subsystem after the required number of replicas are generated).

In the embodiment depicted in FIG. 8, a number of multi-tenant resources may be used, e.g., resources may be shared by several partitions, either of the same stream or of different streams. For example, a given journal storage server 804 may comprise a computer host or other computing device whose processors, memory and/or storage devices may be shared by several replication nodes 806. Similarly, a given storage device 810, such as any of devices 810A, 810B, 810C, 810D, 810E and 810F, may be used to store data records of more than one partition. Furthermore, as indicated above, a given replication node (e.g., a process or thread) may be configured to store replicas of data records of more than one stream. In at least some embodiments, the chain manager 801 may be responsible for deciding, e.g., at stream initialization time and/or in response to dynamic repartitioning decisions, how best to share a limited set of resources (journal storage server hosts, storage devices, and replacement nodes) among the various partitions of one or more data streams. In some environments, the resources available for the replication chains may vary in their capabilities, further increasing the complexity of the chain manager's mapping responsibilities—e.g., some storage servers (such as 804C) may have more local storage devices 810 than others (such as 804A and 804B). The available storage devices 810 may differ in performance, size, or even storage technology (e.g. SSDs may be available at some storage servers, while only rotating disk-based devices may be available at others).

In addition to generating the chain mappings 802, the chain manager 801 may also be responsible for monitoring the health status (e.g., responsiveness) of the various replication nodes 806 in at least some embodiments, and/or to configure replacement replication nodes when certain types of triggering conditions or failures are detected. In one embodiment, a respective node manager 825 may be instantiated at each journal storage server 804—e.g., node manager 825A at storage server 804A, node manager 825B at storage server 806B, and node manager 825C at storage server 806C. The node manager 825 may act as a local agent of the chain manager 801, e.g., to monitor the health of replication nodes 806 using a heartbeat mechanism and notify the chain manager regarding health status changes, to start/stop/replace replication nodes as needed, and so on. The use of node managers 825 may help to reduce the workload that has to be handled by the chain manager 801 in such embodiments. In other embodiments, node managers 825 may not be implemented, and the chain manager 801 may perform the necessary configuration and health monitoring functions without the help of such intermediaries. The chain manager 801 itself may comprise a plurality of software and/or hardware components in some embodiments.

In at least some embodiments in which the storage devices 810 include rotating disks, the replication nodes 806 may attempt to optimize write performance using various techniques. For example, in one such embodiment, the number of disk seeks may be reduced by buffering data records (e.g., in volatile or main memory) and flushing the buffers to disk using large sequential write operations instead of smaller more random write operations. In other embodiments, non-volatile write caches may be used. In at least some embodiments, a given replication node 806 may be configured to ensure that the local replica has been saved to persistent storage before transmitting a write request to the next node in the replication chain (or in the case of the tail node, before transmitting the write acknowledgement to the ingestion subsystem).

As described earlier, retrieval subsystem nodes may receive read requests directed at a given partition from a number of data consumers. A retrieval subsystem node may in turn determine the replication chain configured for the requested records (e.g., by communicating with the chain manager 801 or some other control-plane component), and submit an internal read request to a selected replication node of the chain. The replication node may be selected based on any of various factors in different embodiments, e.g., based on a retrieval workload distribution policy, random selection, affinity (e.g., a retrieval subsystem node may continue to send read requests to a selected replication node as long as the node remains responsive), measured latencies (e.g., the retrieval node may record read latencies for various replication nodes of the chain and preferentially use the nodes that have the lowest read latencies), and so on. In one embodiment, retrieval nodes (e.g., processes or threads responsible for responding to retrieval requests from data consumers) may be implemented at the journal storage servers themselves—e.g., the storage subsystem and the retrieval subsystem may be combined. In such an embodiment, a data consumer may obtain network addresses of the combined retrieval/storage nodes, e.g., from the journal service control subsystem, and may submit read requests to the combination nodes. It is noted that in some embodiments, chained replication of the kind shown in FIG. 8 may not be employed.

Service Resource Redundancy Groups

In some embodiments, the various subsystems of a log-structured journal service may be configured to support desired levels of availability and/or data durability, e.g., using various failover and replication policies. In one embodiment, a provider network at which the journal service is implemented may be organized into a plurality of geographical sub-units or regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers, and/or by distributing the nodes of a given service or application across multiple availability containers.

As mentioned earlier in the context of FIG. 3, in at least some embodiments redundancy groups may be established for various types of nodes of a distributed database service. In one embodiment, redundant groups of nodes may also be configured for one or more of the subsystems of the log-structured journal service. That is, instead of for example configuring one retrieval node for retrieving data records for a stream partition Sj-Pk (the "k"th partition of stream "j"), two or more nodes may be established for such retrievals, with one node being granted a "primary" or active role at a given point in time, while the other node or nodes are designated as "non-primary" nodes. The current primary node may be responsible for responding to work requests, e.g., requests received either from clients or from nodes of other subsystems. The non-primary node or nodes may remain dormant until a failover is triggered, e.g., due to a failure, loss of connectivity to the primary, or other triggering conditions, at which point a selected non-primary may be notified by a control-plane node to take over the responsibilities of the previous primary. The primary role may thus be revoked from the current incumbent primary node during failover, and granted to a current non-primary node. In some embodiments, non-primary nodes may themselves take over as primary when a determination is made that a failover is to occur, e.g., explicit notifications may not be required. Respective redundant groups of nodes may be set up for ingestion, storage, retrieval and/or control-plane functions at a log-structured journal service in various embodiments. It is noted that redundancy groups of storage nodes may be implemented independently of the number of physical copies of the data records that are stored—e.g., the number of replicas to be stored of a data record may be determined by a persistence policy, while the number of storage nodes that are configured for the corresponding partition may be determined based on redundancy policies.

Figure 9:
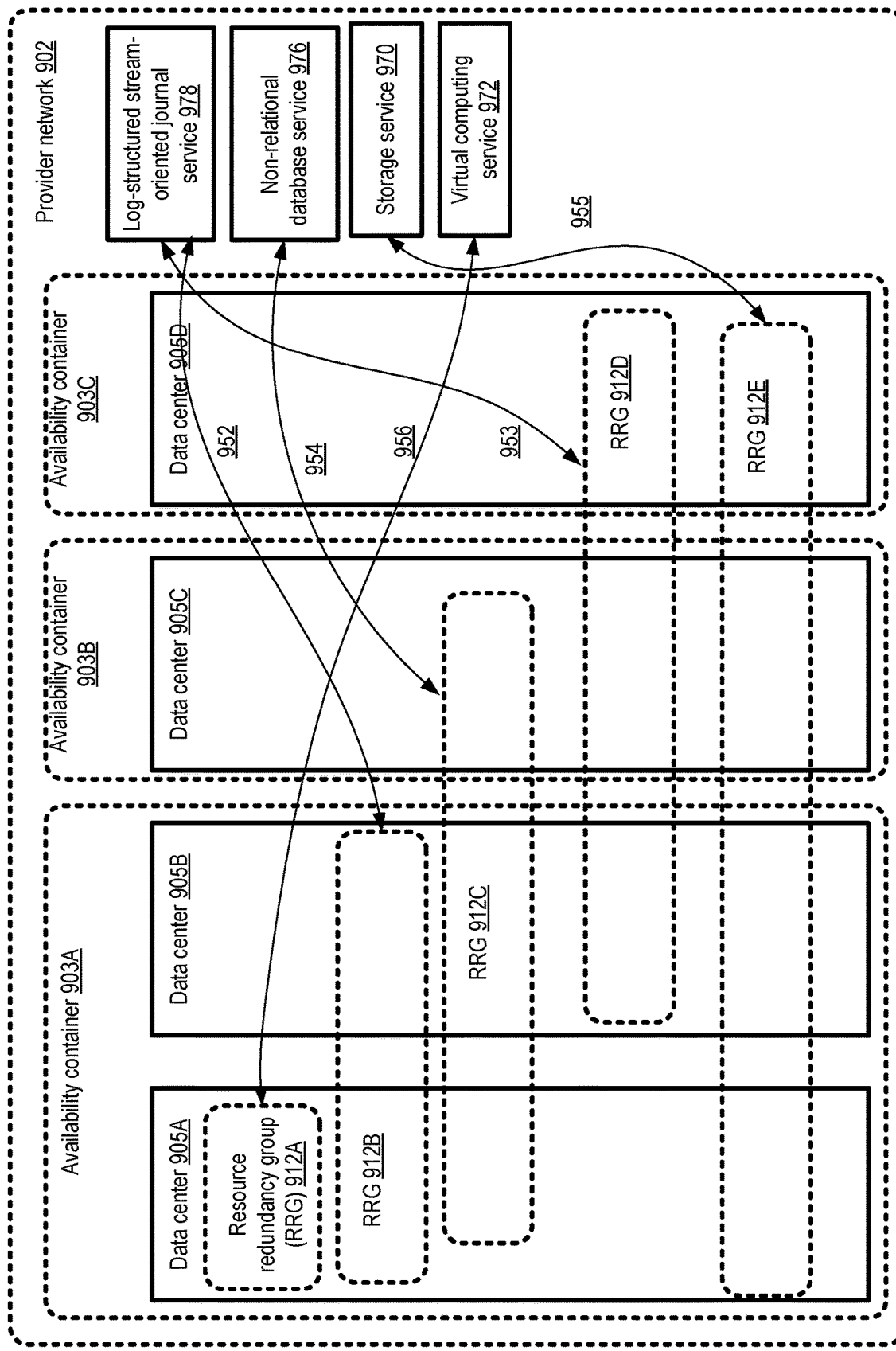
FIG. 9 illustrates examples of redundancy groups for service resources at a provider network, according to at least some embodiments.

FIG. 9 illustrates examples of redundancy groups for service resources at a provider network, according to at least some embodiments. In the depicted embodiment, provider network 902 comprises three availability containers 903A, 903B and 903C. Each availability container includes portions or all of one or more data centers—e.g., availability container 903A comprises data centers 905A and 905B, availability container 903B includes data center 905C, and availability container 903C includes data center 905D. At provider network 902, several different network-accessible services may be implemented, such as a log-structured stream-oriented journal service 978, a non-relational database service 976, a storage service 970 and a virtual computing service 972. Resources of a given service may sometimes be employed at other services—for example, virtual machines of the virtual computing service may be configured as BTSNs or CDPNs in some embodiments, the storage service may be used for snapshots generated for tables stored at the database service, the log-structured journal service may be used by the database service, and so on. Each service may comprise one or more subsystems with respective sets of nodes distributed among the data centers 905 (such as the ingestion, storage and retrieval subsystems discussed above for a journal service, the base table and CDP subsystems of a database service, etc.).

Depending on the particular data durability, availability and/or failure resilience characteristics of a given client application at a given service, resource redundancy groups (RRGs) 912 of various sizes may be established using resources at one or more of the availability containers 903. For example, RRG 912A established by virtual computing service 972 (as indicated by arrow 956) may include multiple virtual machines at different hosts within a single data center 905A. For one or more subsystems of log-structured journal service 978, RRGs 912B and 912D, each using resources distributed among multiple data centers 905, may be established as indicated by arrows 952 and 953. In the depicted embodiment, RRG 912C, established for example for BTSNs or CDPNs of the database service 976 as indicated by arrow 954, spans three data centers. RRG 912E, established for storage service 970 as indicated by arrow 955, utilizes devices distributed among four data centers. In general, the nodes of a given resource redundancy group may be distributed across multiple data centers and/or multiple availability containers, e.g., to increase the probability that at least one node of the group survives in the event of a large-scale outage. For applications whose availability or data durability requirements are less stringent, a single availability container may suffice.

Cross-Region Restores

Figure 10:
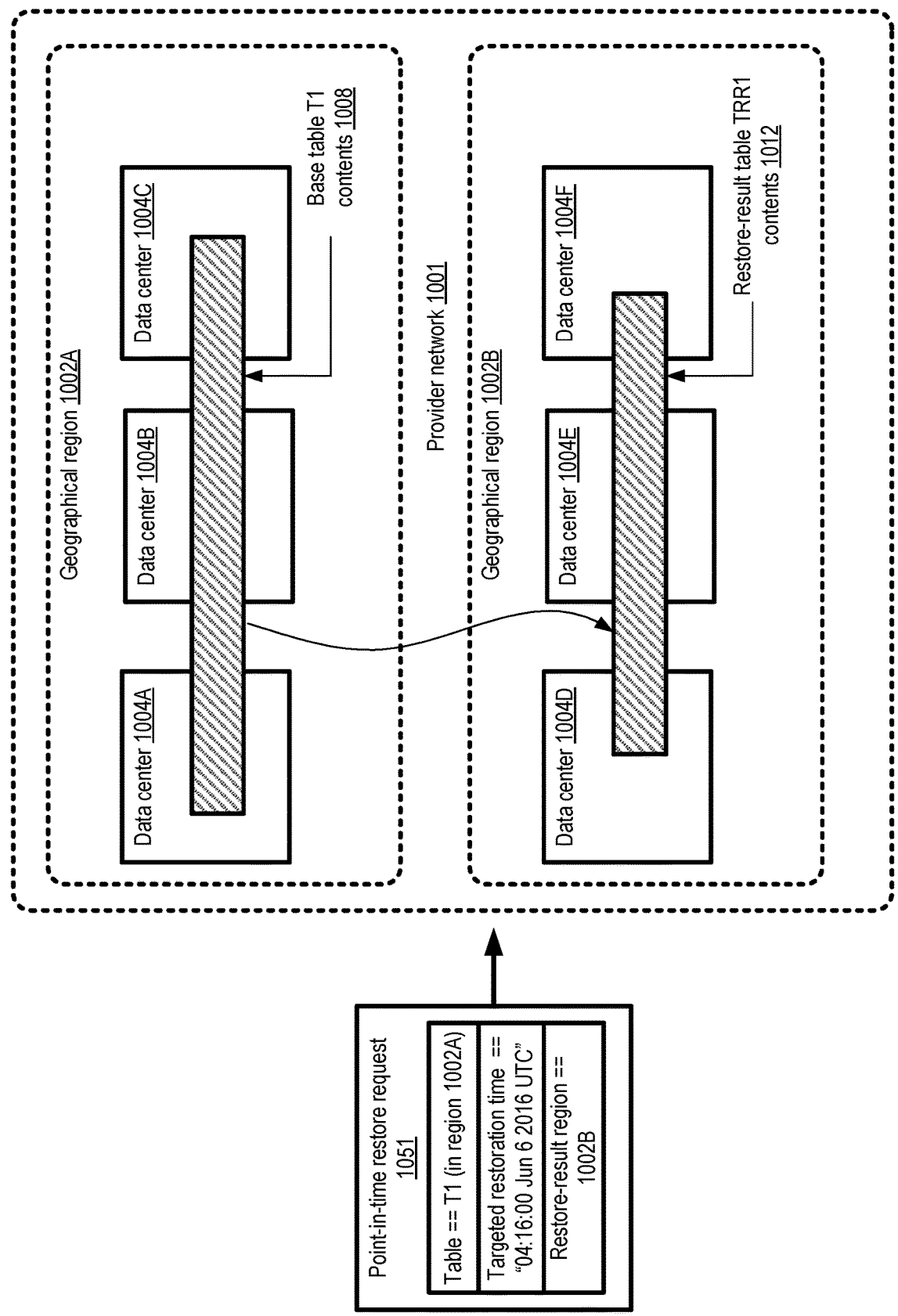
FIG. 10 illustrates an example of a cross-region point-in-time restore operation, according to at least some embodiments.

In some embodiments, the journal-based continuous data protection capability described above may be employed to create point-in-time copies of a database table at a provider network geographical sub-unit or location (such as a region or data center) that differs from the location of the original table. FIG. 10 illustrates an example of a cross-region point-in-time restore operation, according to at least some embodiments. As shown, the provider network 1001 comprises two geographical regions 1002A and 1002B in the depicted embodiment. Region 1002A includes data centers 1004A, 1004B and 1004C, while region 1002B includes data centers 1004D, 1004E and 1004F.

In the depicted scenario, contents 1008 of a base table may initially be stored at devices located at the three data centers 1004A-1004C of region 1002A. In some embodiments, each client of the database service may be assigned a "home" region, and the client's tables may be stored at data centers located within that home region by default. Continuous data protection may be enabled for table T1, e.g., at the request of the client on whose behalf T1 was created. As a result, the transmission of T1's change records to a journal service (whose resources may also be distributed across the different data centers and regions) maybe initiated, and snapshots of T1 may be stored periodically as discussed above (e.g., at a storage service whose resources may also be distributed).

A point-in-time restore request 1051 for table T1 may be received, indicating a targeted restoration time and a restore-result region 1002B. In response, a set of BTSNs located in the data centers 1004D-1004F may be identified to store the contents 1012 of result-restore table TRR1. If the change records for table T1 are replicated at devices located in region 1002B (e.g., if a redundancy group for the journal storage nodes includes some nodes in region 1002B), and/or if the snapshots of table T1 are replicated in region 1002B, those nearby snapshots and change records may be utilized to generate restore-result table TRR1 in the depicted embodiment. In some embodiments, the number of data centers at which the restore-result table is stored may differ from the number of data centers at which the base table was stored, and/or the number of redundant replicas of the restore-result table may differ from the number of redundant replicas of the base table.

Global Secondary Indexes

Figure 11:
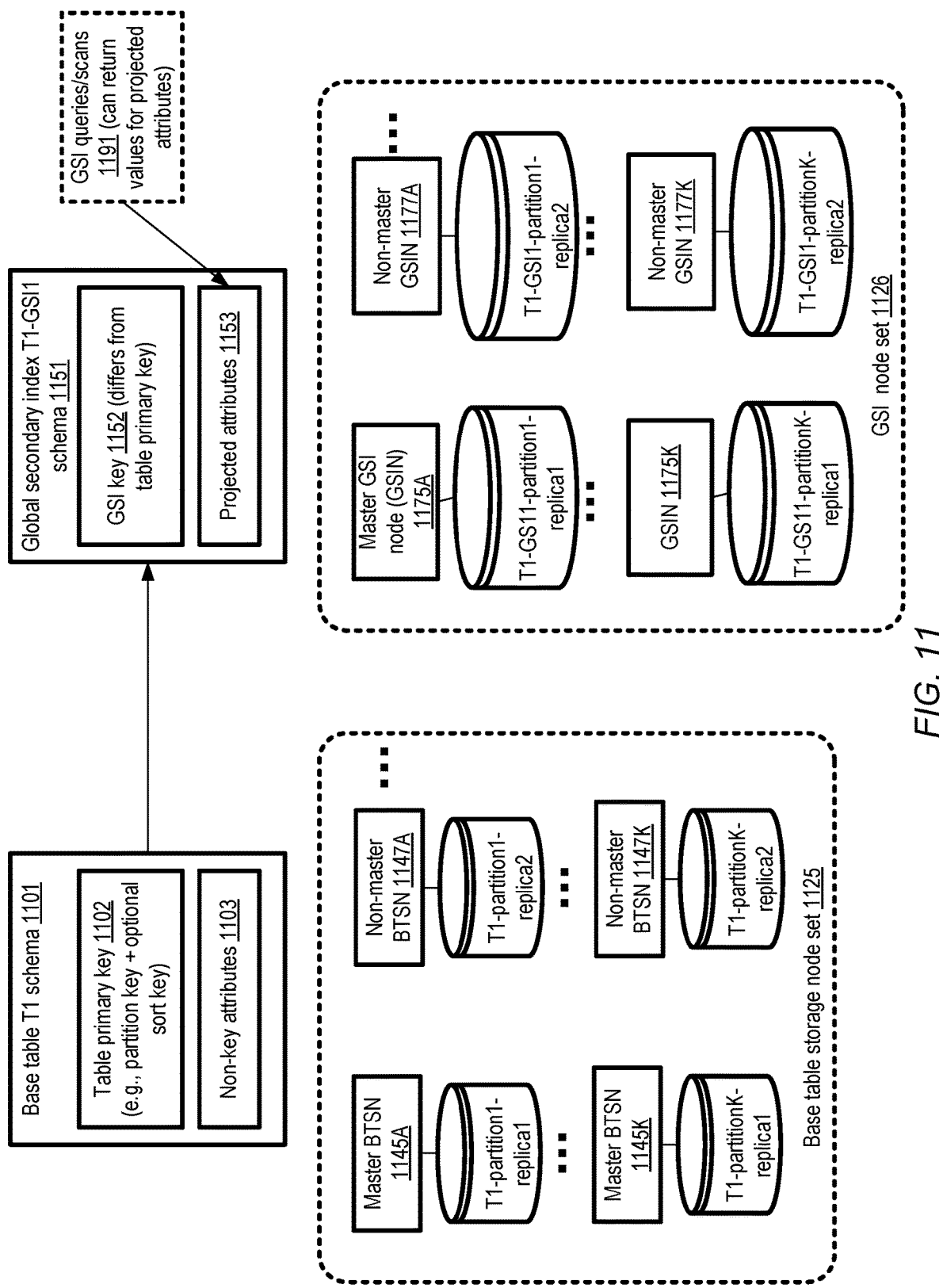
FIG. 11 illustrates an example global secondary index for a base table of a key-value non-relational database, according to at least some embodiments.

As mentioned earlier, in some embodiments a non-relational database may provide support for creating global secondary indexes, which may allow queries based on non-primary keys of a key-value table to be performed efficiently. FIG. 11 illustrates an example global secondary index for a base table of a key-value non-relational database, according to at least some embodiments. In the depicted embodiment, base table T1's schema 1101 indicates a primary key 1102 and a set of non-key attributes 1103. The primary key 1101 may comprise a partition key (to which a hash function may be applied to determine the partition to which a given row of the table belongs) and an optional sort key (to be used to determine the storage order of different rows of the same partition). Base table contents may be distributed among a set 1125 of base table storage nodes (BTSNs) of the database service in the depicted embodiment. For each partition of the base table, a replication group of BTSNs may be established, comprising a master BTSN (such as master BTSN 1145A or 1145B for partition1 and partitionK respectively) and one or more non-master BTSNs (such as non-master BTSNs 1147A and 1147K for partition1 and partition respectively). Each member of a redundancy group may store a respective replica of the base table partition—e.g., replica1 of partition1 may be stored at BTSN 1145A, replica2 of partition1 may be stored at BTSN 1147A, etc.

One or more global secondary indexes (GSIs), such as T1-GSI1, may be created for the base table T1 in the depicted embodiment at any time during the lifetime of T1—e.g., either at the time that T1 is created, or after T1 has been populated with some data. Each GSI may be constructed to optimize performance for queries, scans and/or other operations formulated in terms of a corresponding specified GSI key 1152 (typically different from the primary key of the base table) in the depicted embodiment. In addition to the GSI key values, a GSI such as T1-GSI1 may also include values for some selected set of projected attributes 1153 of the base table in various embodiments. In at least some embodiments, the GSIs may also include the values of the table's primary key attributes (at least by default). GSI queries and scans 1191 may return values of some or all of the projected attributes, e.g., in addition to the GSI key attributes and/or the primary key attributes in the depicted embodiment. In order to support such queries efficiently, the contents of the projected attributes and the key attributes may be re-materialized at the GSIs—that is, a given GSI may contain a copy of a subset of the contents of the base table, organized to optimize a different set of queries and other read operations than are handled most efficiently by the base table. The term "global" in the name "global secondary index" may indicate that a GSI query or scan can be directed to the entire table, as opposed, for example, to a single partition of the table at a time. In some embodiments, local secondary indexes at the partition-level may be supported as well as global secondary indexes; such local secondary indexes may not require re-materialization of the table contents in at least one such embodiment, as partition-level queries and scans directed at non-primary-key attributes may be handled efficiently at the BTSNs themselves.

In the depicted embodiment, a set of GSI nodes (GSINs) 1126 may be established for storing GSI contents and handling GSI queries and scans. GSINs may also be referred to as index storage nodes. The GSI key may be used to partition GSI contents, in a manner similar to the way the base table's partition key is used to partition base table contents. A similar partition-based redundancy group arrangement may be used for GSINs as is used for BTSNs—for example, a redundancy group comprising master GSIN 1175A and non-master GSIN 1177A may be used for respective replicas of partition1 of T1-GSI1, master GSIN 1175B and non-master GSIN 1177B may be used for respective replicas of partition2 of T1-GSI1, etc. In general, writes that are directed to the base table may have to be propagated to the appropriate set of GSI nodes that are affected by the writes. If such write propagation were handled entirely by the base table storage nodes, this may pose an excessive performance overhead, depending for example on the number of GSIs created, the rate at which updates affecting the different GSIs occur, and so on. Accordingly, in various embodiments, a log-structured journal may be used as a way of propagating writes to GSI nodes, as described below in further detail.

Figure 12:
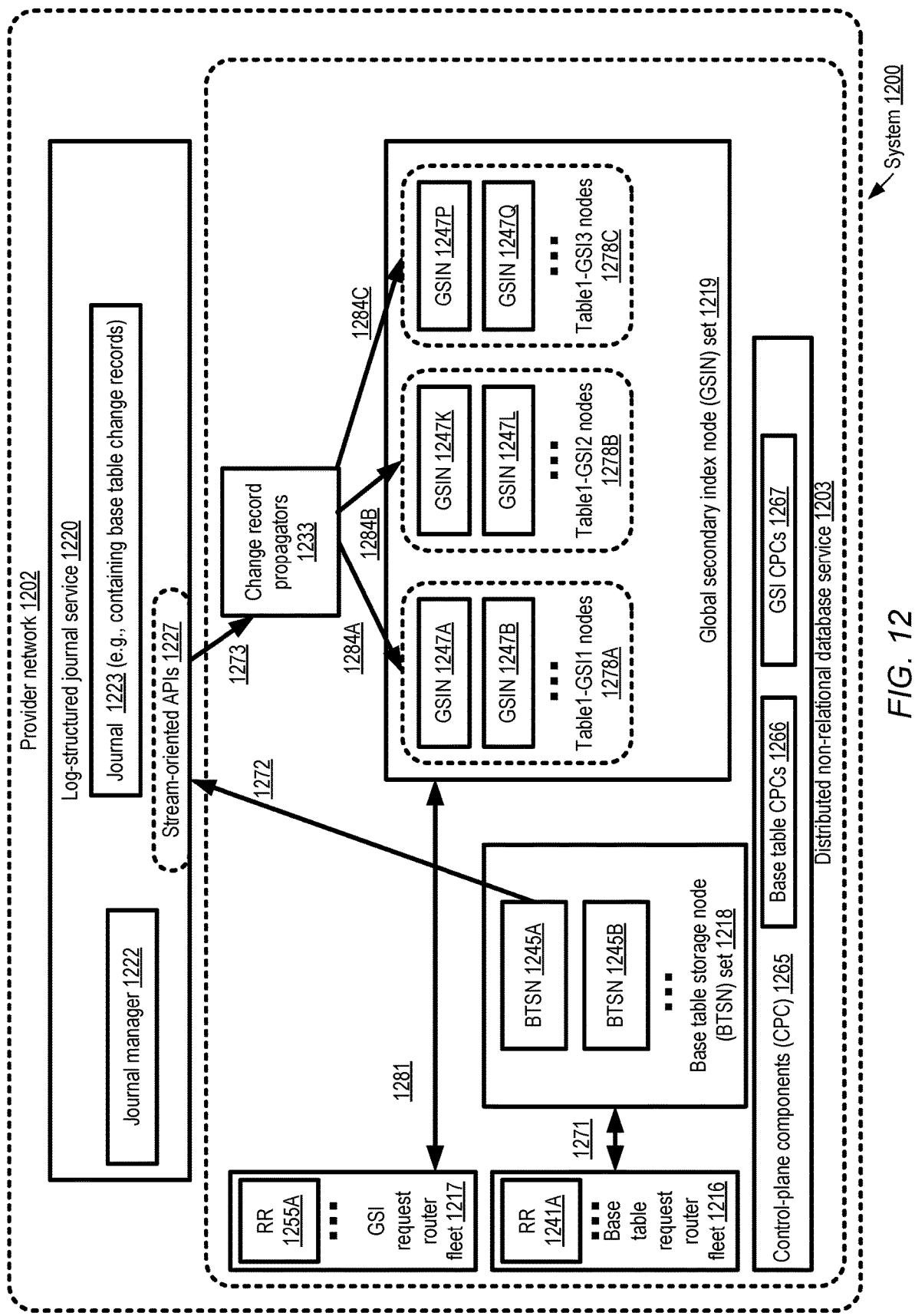
FIG. 12 illustrates an example system environment in which global secondary indexes for a non-relational database service are maintained using a log-structured journal service, according to at least some embodiments.

FIG. 12 illustrates an example system environment in which global secondary indexes for a non-relational database service are maintained using a log-structured journal service, according to at least some embodiments. As shown, system 1200 includes a distributed non-relational database service 1203 and a log-structured journal service 1220. One fleet 1216 of request routers 1241 (e.g., request router 1241A) may be established in the depicted embodiment for base table-related client requests, while a separate fleet 1217 of request routers 1255 (e.g., 1255A) may be established for GSI-related client requests. In such an arrangement, the number of request routers used for base table requests may be scaled up or down independently of changes to the GSI request router fleet, which may enable better resource utilization in some cases than if a single fleet of request routers were used. The base table request routers 1241 may transmit or forward client requests (e.g., reads or writes) associated with base tables and formulated in terms of the table primary keys to the BTSNs 1245 (e.g., 1245A or 1245B) of BTSN set 1218, as indicated by arrow 1271. GSI request routers 1255 may forward client requests for GSI operations (e.g., reads formulated in terms of GSI keys) to GSI nodes 1247 (as indicated by arrow 1281). In some embodiments, the partition key of the targeted GSI may be used at the GSI request routers to determine which particular GSI node should be selected as the target for a given GSI operation request, and partition keys of the base tables may be used at the base table request routers to select targets for base table operation requests. Respective sets of GSINs are shown for three different GSIs established for a given base table Table1: Table1-GSI1 nodes 1278A comprising GSINs 1247A and 1247B, Table1-GSI2 nodes 1278B comprising GSINs 1247K and 1247L, and Table1-GSI3 nodes 1278C comprising GSINs 1247P and 1247Q. Separate subsets of control-plane components (CPCs) 1265 may be established for base tables (e.g., CPCs 1266) and GSIs (e.g., CPCs 1267) in some embodiments.

According to at least one embodiment, a request to create a GSI for a given table such as Table1 may be received at the database service (e.g., at a control-plane component 1265). The request may indicate parameters such as, for example, the GSI key (which may differ from the primary key of Table1), a provisioned throughput level for the requested GSI, and zero or more non-key attributes of the base table Table1 which are to be included in the requested GSI. In response, components of the database service may initiate transmission of change records of the base table Table1 from its BTSNs to a journal manager 1222 of a log-structured journal 1223 maintained at journal service 1220, in a manner similar to the initiation of change records for enabling continuous data protection as discussed earlier. In some embodiments the transmission of such change records may already have been set up previously (e.g., for continuous data protection or to enable update streams) in which case, in response to the GSI creation request, the database service components may simply have to verify that the change records are being transmitted. The journal service 1220 may implement a set of stream-oriented APIs 1227 in at least some embodiments, which may be used for submitting the change records as indicated by arrow 1272. Upon receiving a change record, the journal manager may perform one or more acceptability checks (e.g., to ensure that the submitted record is not a duplicate), and append the change record to the journal. Each change record appended to the journal may have a sequence number assigned to it in various embodiments, indicative of the order in which it was processed by the journal manager relative to other change records. In at least some embodiments, different storage protocols and storage engines may be used at the journal than at the database nodes—for example, a write-once protocol may be used at the journal, so that a given entry may not be modifiable after it has been added to the journal, while an overwrite-in-place storage protocol may be used at the BTSNs and the GSINs.

In at least one embodiment, in addition to ensuring that change records are being submitted from the base table Table1's BTSNs to the journal manager 1222, one or more change record propagators 1233 may be set up in response to a GSI creation request (e.g., if sufficient propagators have not already been set up). As indicated by arrows 1273, stream-oriented APIs of the journal service may be used by the propagators to read the contents of change records appended to the journal over time. The set of changes relevant to each GSI may be identified and passed on to the relevant GSINs, as indicated by arrows 1284A, 1284B and 1284C.

In some embodiments, the change record propagators 1233 may be multiplexed—e.g., one propagator may be responsible for transmitting relevant changes to more than one GSI partition of more than one GSI. A given change record propagator may examine a change record appended to the journal and determine whether the changes indicated therein are to be represented at one or more GSIs. Metadata such as GSI definitions (including GSI key schemas, projected attribute lists, etc.), or and/or other metadata may be provided by the database control plane components to the change record propagators to enable them to filter the set of changes appropriately for the different GSI nodes. If a write indicated in the change record is to be represented at one or more GSIs, the particular GSI node or nodes to which that write should be propagated may be identified using the metadata, and an indication of the write may be transmitted to the identified GSIN. At a given GSIN 1247, the changes transmitted by the propagator 1233 may be used to construct or modify the corresponding GSI or GSI partition. In various embodiments, the GSI control-plane components may either configure or establish new GSINs for a newly-created GSI, or re-use existing GSINs. Decisions as to whether a new GSIN should be established or an old one re-used may be made for example based on collected performance metrics, the provisioned throughput requirements of the new GSI, and/or other factors. In some embodiments, the number of GSINs to be used for a given GSI may be determined based at least in part on a provisioned throughput specification for the GSI (which may be indicated by the client on whose behalf the GSI is being created) and/or on an expected size of the GSI. For example, a given GSIN may have the performance and storage capacity to support 1000 IOPS, so ten such GSINs may be established for a GSI for which 10000 IOPS are to be provisioned. Generally speaking, several of the techniques discussed above with respect to continuous data protection may be employed for GSIs as well—e.g., respective shards of the journal may be used for change records of respective base table partitions, chained replication may be used at the journal, redundancy groups of various service resources may be established across data centers or availability containers, selected change records of the journal may be trimmed after they have been examined by the appropriate set of change record propagators, and so on. In at least one embodiment, intermediary journal consumers similar to the change record propagators 1233 may be established for reading and transmitting change records to continuous data protection nodes to enable point-in-time restores of base tables. In one embodiment, a change record propagator may be incorporated within, or instantiated at, a GSIN.

Asynchronous Change Record Propagation

Figure 13:
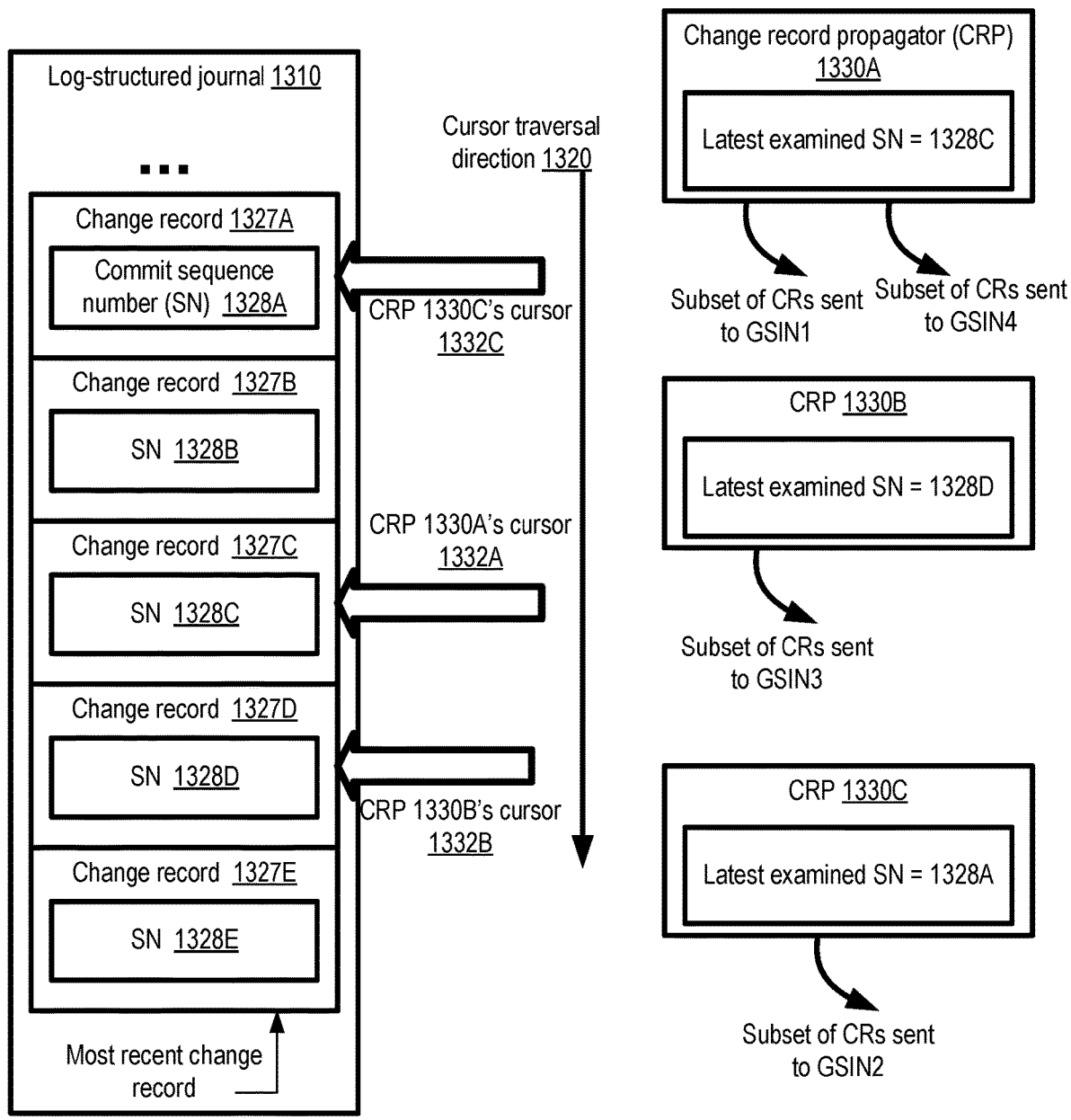
FIG. 13 illustrates asynchronous processing of a log-structured journal by change record propagators established for global secondary indexes, according to at least some embodiments.

In various embodiments, change records may be retrieved by different journal consumers (such as the change record propagators set up for GSIs, or by continuous data protection nodes) independently of one another, and asynchronously with respect to the times at which the records are appended to the journal. FIG. 13 illustrates asynchronous processing of a log-structured journal by change record propagators established for global secondary indexes, according to at least some embodiments. As shown, log-structured journal 1310 comprises a plurality of change records 1327, such as records 1327A-1327E, among which 1327E is the most recently appended as of the state of the journal represented in FIG. 13. Each change record has a corresponding commit sequence number (SN) (e.g., SNs 1328A-1328E) indicative of the order in which it was appended relative to other change records of the journal. As discussed earlier, in some embodiments each change record may include an indication of one or more committed writes applied to a base table—e.g., comprising a pre-image of the written object(s) and a post-image of the written object(s).

Change record propagators (CRPs) 1330A-1330C have been established to examine the contents if the journal sequentially, and to transmit relevant writes or changes to a plurality of GSI nodes GSIN1-GSIN4. In effect, each of the CRPs 1330 establishes a respective read cursor on the journal, such as cursors 1332A of CRP 1330A, cursor 1332B of CRP 1330B and cursor 1332C of cursor 1330C. Each cursor traverses the change records in the sequential order of increasing SNs, as indicated by arrow 1320. Each CRP keeps track of the most recent change record examined, e.g., using a respective last-examined commit SN value.

At the point of time corresponding to FIG. 13, CRP 1330A has completed analyzing change record with SNs up to 1328C, CRP 1330B has most recently analyzed change record with SN 1328D, and CRP 1330C has completed analyzing change records with SNs up to 1328A. As it examines a given change record, each CRP determines whether the changes indicated in that record should be propagated to any of the GSI nodes for which that CRP was configured. In order to check whether a given write is to be sent to a given GSIN, in some embodiments the set of attributes whose values are modified may be compared with the set of attributes projected or materialized at the GSIN (which may in turn depend on the GSI key value of the modified rows or records). Metadata indicating the GSI keys and projected attributes, the journal shards from which different partitions of the table can be read, and so on, may be obtained at the change record propagators from the database control-plane components in some embodiments. The subset of change records whose changes are to be represented (at least in part) at GSIN1 or at GSIN4 may be transmitted to those nodes from CRP 1330A in the depicted embodiment. Similarly, the subset of change records affecting GSIN3 may be filtered from the journal and transmitted to GSIN3 by CRP 1330B, and the subset of change record affecting GSIN2 may be identified from the journal and transmitted to GSIN2 by CRP 1330C. Because of the asynchronous nature of the operations of the change record propagators, not all the GSIs may reflect a given change made at the base table at the same time in the depicted embodiment. Furthermore, in general there may be a slight delay between the time that a given change is committed at the base table, and the time at which that change is incorporated into the appropriate set of GSIs of the base table. An "eventually consistent" level of consistency may be supported for GSIs in the depicted embodiment, in which the GSIs may take some time to "catch up" with changes made to base tables, and different GSIs may not always incorporate the same set of base table changes at a given point in time. In at least one embodiment, after a set of change records has been examined by all the change record propagators or other journal consumers, the set may be discarded—e.g., further accesses to the set of change records may be prohibited or disabled, and the journal may be "trimmed". In some embodiments, such trimming may be performed on a shard-level basis, e.g., after a new child shard has been created, its parent shard may be trimmed from the journal.

Creating a Global Secondary Index for a Pre-Populated Table

Figure 14A:
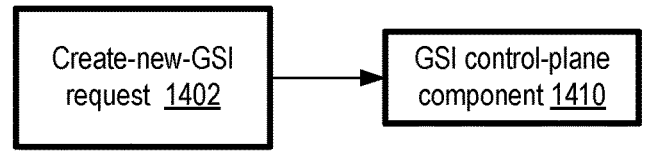
FIG. 14*a*, FIG. 14*b*, FIG. 15*a* and FIG. 15*b* collectively illustrate an example procedure for the creation of a global secondary index for a table with pre-existing content, according to at least some embodiments.
Figure 14A:
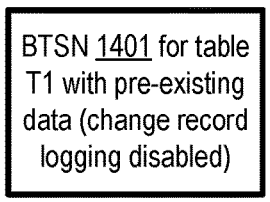

In at least some embodiments, GSIs may be created for base tables either at the time of table creation, or at some later time when the base table already includes some data. In the latter scenario, a snapshot or copy of the pre-existing table contents may be stored as part of a phased creation of a requested GSI. FIG. 14*a*, FIG. 14*b*, FIG. 15*a* and FIG. 15*b* collectively illustrate an example procedure for the creation of a global secondary index for a table with pre-existing content, according to at least some embodiments. In FIG. 14*a*, a request 1402 to create a new GSI for a base table T1 (which does not have change logging enabled, does not have any previously-created GSIs, and does not have any snapshots) whose contents are stored at a BTSN 1401 is received, e.g., at a control-plane component 1410 of the database service.

Figure 14B:
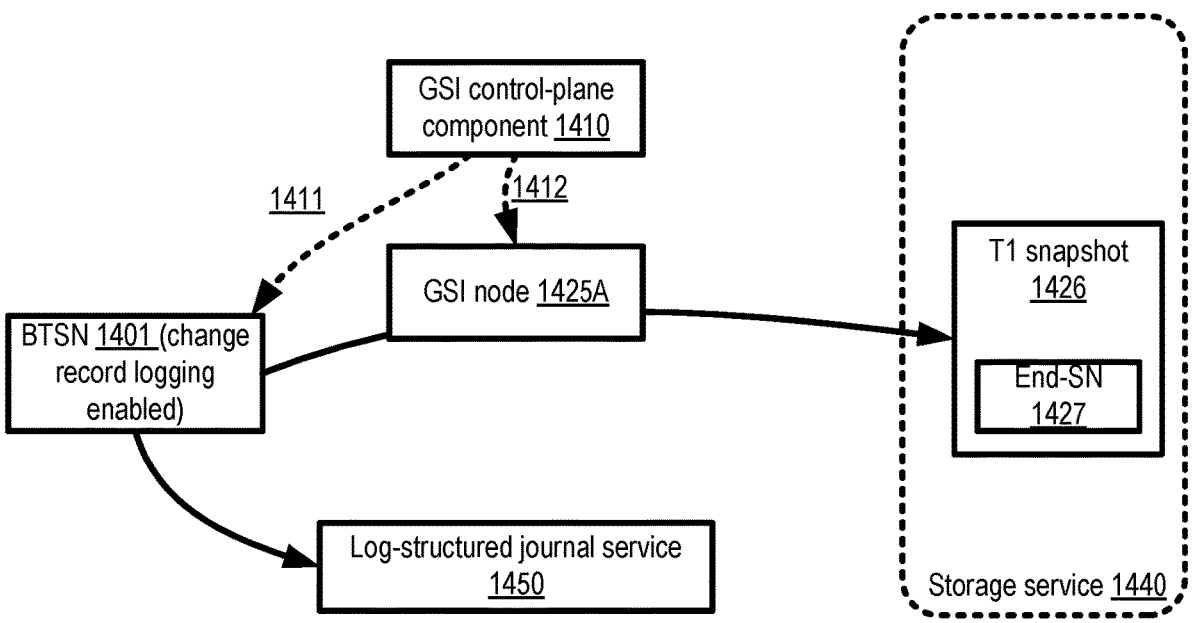

As indicated by arrow 1411 in FIG. 14*b*, the control-plane component 1410 may perform the necessary configuration changes to enable the flow of table T1's change records from the BTSN 1401 to a log-structured journal service 1450 in response to the GSI creation request. Such configuration changes may, for example, include the issuance of a "createStream" API call to the journal, receiving an indication of a stream shard to which the change records should be submitted, and providing the stream shard to the BTSN 1401. In addition, as indicated by arrow 1412 of FIG. 14*b*, the control-plane component 1410 may instantiate or configure one or more GSI nodes 1425, such as node 1425A, to create a snapshot of the table T1 by copying the contents of the base table to staging storage service 1440. The devices of the storage service used for the snapshot may be considered a temporary staging location for T1's contents, and the storage used for the snapshot 1426 may be freed after it has been used to create the initial version of the GSI. The snapshot 1426 may indicate an end-sequence number 1427 corresponding to the most recent write to the base table T1 which has been incorporated within the snapshot.

Figure 15A:
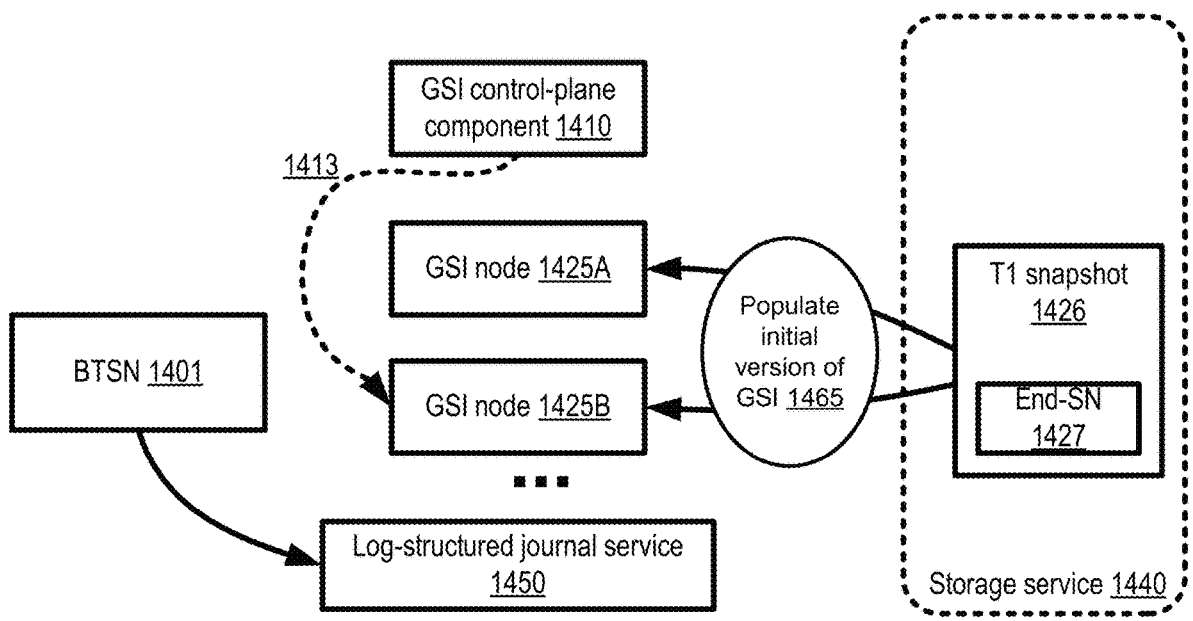

After the snapshot 1426 has been generated, an initial version of the requested GSI may be created at one or more GSINs 1425, as indicated by arrows 1465 in FIG. 15*a*. In some cases, more GSINs may be configured to store the GSI than were configured to create the snapshot: for example, as indicated by arrow 1413, GSIN 1425B may be configured in addition to GSIN 1425A. In some cases, fewer GSINs may be employed for the GSI than were configured for creating the snapshot, or exactly the same number of GSINs may be used for creating the snapshot as are used for populating the initial version of the GSI. Meanwhile, during the time that the initial version of the GSI is created, change records corresponding to updates to the base table T1 may continue to be accumulated at the journal service 1450.

Figure 15B:
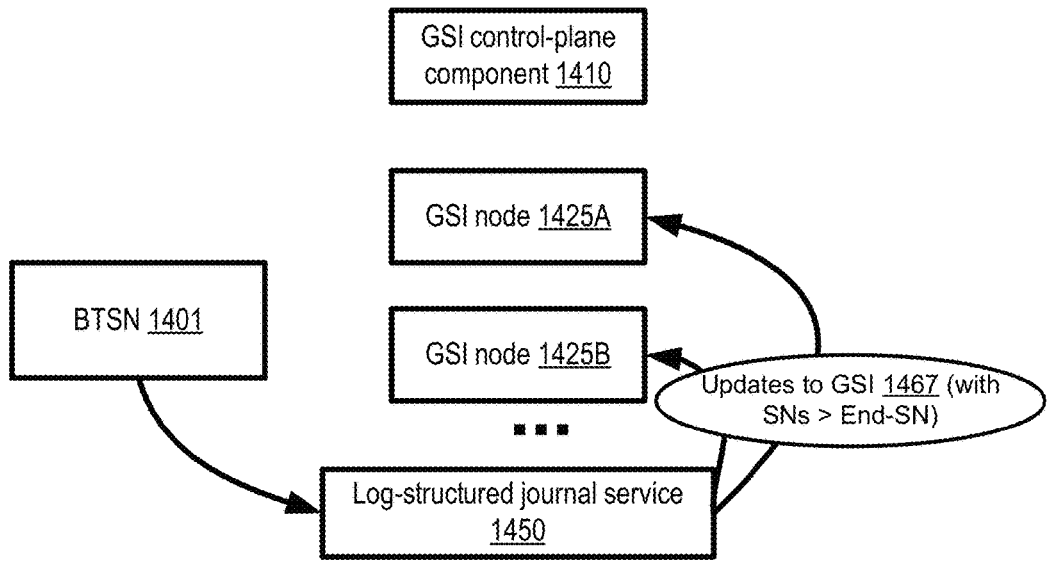

After the initial version of the requested GSI has been created, change record propagators may transmit the subset of change records which were not included in the initial version to the GSINs, as indicated by arrows 1467 in FIG. 15*b*. The appropriate subset of change records to be propagated may be identified using the end sequence number 1427 of the snapshot 1426—e.g., only those change records with higher sequence numbers than end-SN 1427 may have to be propagated to GSINs 1425 in the depicted example. Information about the sequence numbers of the change records to be selected for updating the GSI and/or about the table attributes which are materialized at the GSI, may be provided to the appropriate change record propagators by control-plane components 1410 in various embodiments. As more updates are performed at the base table and corresponding change records are appended to the journal, the GSI may also be updated accordingly. As mentioned earlier, the snapshot 1426 used for staging the contents of the table while creating the new GSI may be deleted in some embodiments after the initial version of the GSI has been populated.

Figure 16:
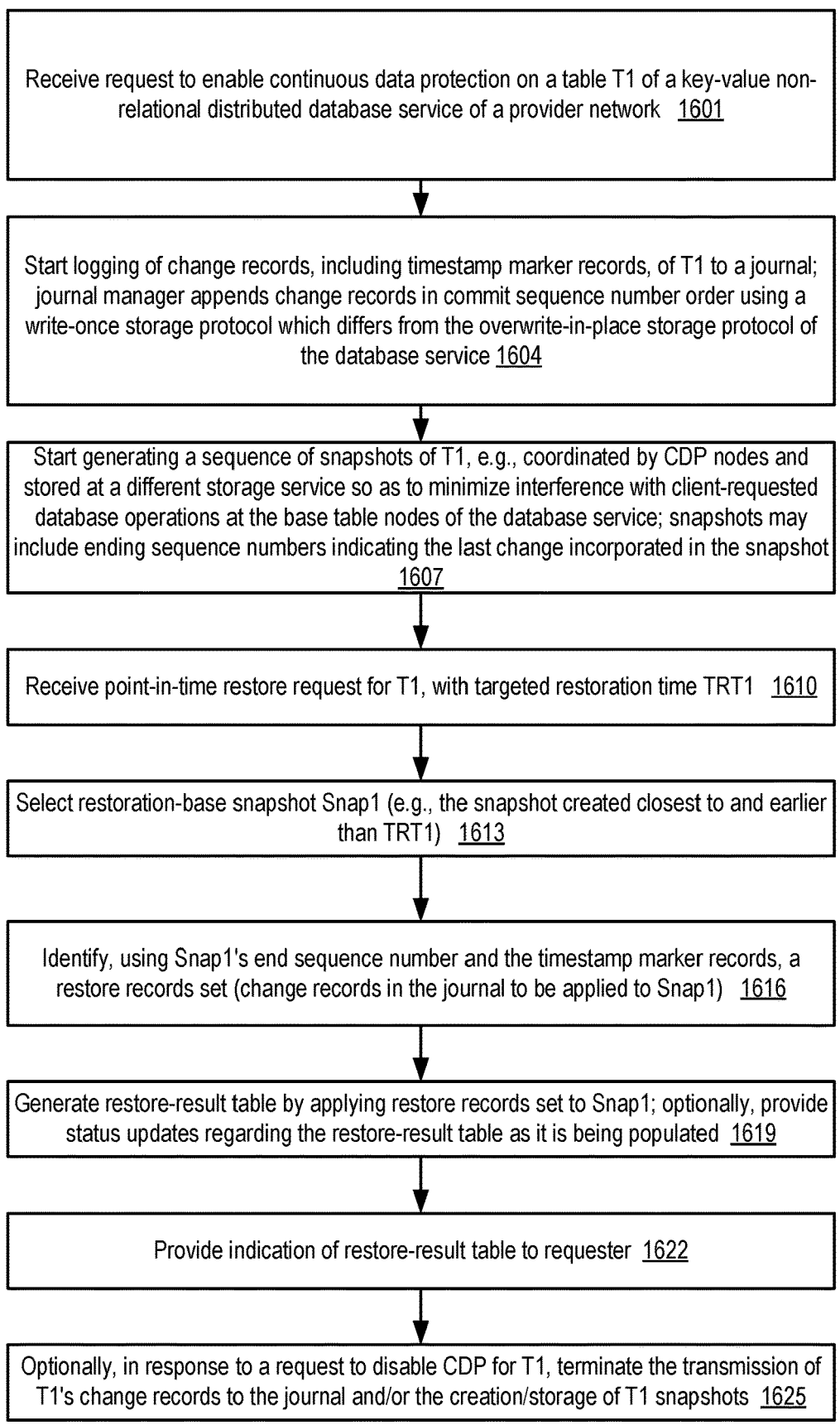
FIG. 16 is a flow diagram illustrating aspects of operations that may be performed to implement continuous data protection for a distributed database system using a log-structured journal, according to at least some embodiments.

Methods for Continuous Data Protection and Global Secondary Index Implementation FIG. 16 is a flow diagram illustrating aspects of operations that may be performed to implement continuous data protection for a distributed database system using a log-structured journal, according to at least some embodiments. As shown in element 1601, a request to enable continuous data protection for a table T1 of a key-value non-relational distributed database service of a provider network may be received, e.g., at a control-plane component of the database service from a client. The logging of change records of T1 form table storage nodes to a journal may be initiated (element 1604) in response to the request in the depicted embodiment, e.g., unless the control-plane of the database service is able to verify that such logging is already underway. The journal may be stored and managed at a different service of the provider network in some implementations, although in other implementations the journal may be a subcomponent of the database service. Each change record may represent a set of writes of a committed transaction directed to T1—for example, the before-image and after-image corresponding to one or more writes may be included in a given change record. In addition to change records themselves, timestamp marker records may be transmitted to the journal from the table storage nodes in some embodiments, which can be used to identify the particular change records generated during specified periods of wall-clock time. A journal manager may append the transmitted change records in commit sequence number order to a journal using a write-once storage protocol in some embodiments, which may differ from the overwrite-in-place storage protocol used for table storage at the database service. The commit sequence number assigned to a given change record may indicate the order in which that record was processed at the journal manager relative to other change records. In various embodiments, the journal manager may be responsible for de-duplication of change records, so that any given write to T1 is represented in the journal exactly once.

In addition to initiating or verifying the transmission of T1 change records to the journal, in at least some embodiments a process to generate a sequence of snapshots of T1 may be initiated (element 1607). In some cases such snapshots may already be scheduled, in which case a new sequence of snapshots may not necessarily be initiated. In some implementations, the snapshots may be stored at a different storage service of the provider network, and may be coordinated by a set of dedicated continuous data protection nodes of the database service so as to minimize the impact of snapshot creation on the read and write client requests directed to T1 and other base tables of the database service. In one embodiment, each snapshot may have a corresponding end sequence number or creation time, indicating the set of change records which are represented in the snapshot. In some embodiments, a response may be provided to the client, indicating that continuous data protection has been enabled for T1.

At some time after continuous data protection has been enabled, a point-in-time restore request for table T1 indicating a targeted restoration time TRT1 (i.e., the point-in-time to which the state of the table is to be restored) may be received (element 1610). A base snapshot Snap1 for the restore operation may be identified from among the sequence of snapshots generated for T1 (element 1613). For example, the particular snapshot which was created closest to and earlier than TRT1 may be selected in some embodiments. In other embodiments, the selected snapshot need not necessarily be the one that was created closest to TRT1.

From the journal, a set of restore records representing the additional writes which are not incorporated in the base snapshot Snap1 may be identified (element 1616). The restore records may be identified based on their sequence numbers, e.g., using the end sequence number of Snap1 as the starting restore record sequence number, and a time marker record close to TRT1 to identify the last change record of the restore records set. The changes indicated in the restore record set may be applied, e.g., in sequence number order, to the base snapshot to create the restore result table (element 1619). In one embodiment, a programmatic interface (such as a web-based console) may be provided to enable clients to view the state of the restore-result table (e.g., what fraction of the table has currently been restored) while the restore operation is still in progress. An indication of the result table may be provided to the submitter of the point-in-time restore request in some embodiments (element 1622) after the restore operation is complete. In some embodiments, a programmatic interface enabling clients to request the disabling of continuous data protection may be supported. In such an embodiment, in response to a CDP disablement request for table T1, the transmission of T1's change records to the journal and/or the creation of snapshots of T1 may be terminated (element 1625).

Figure 17:
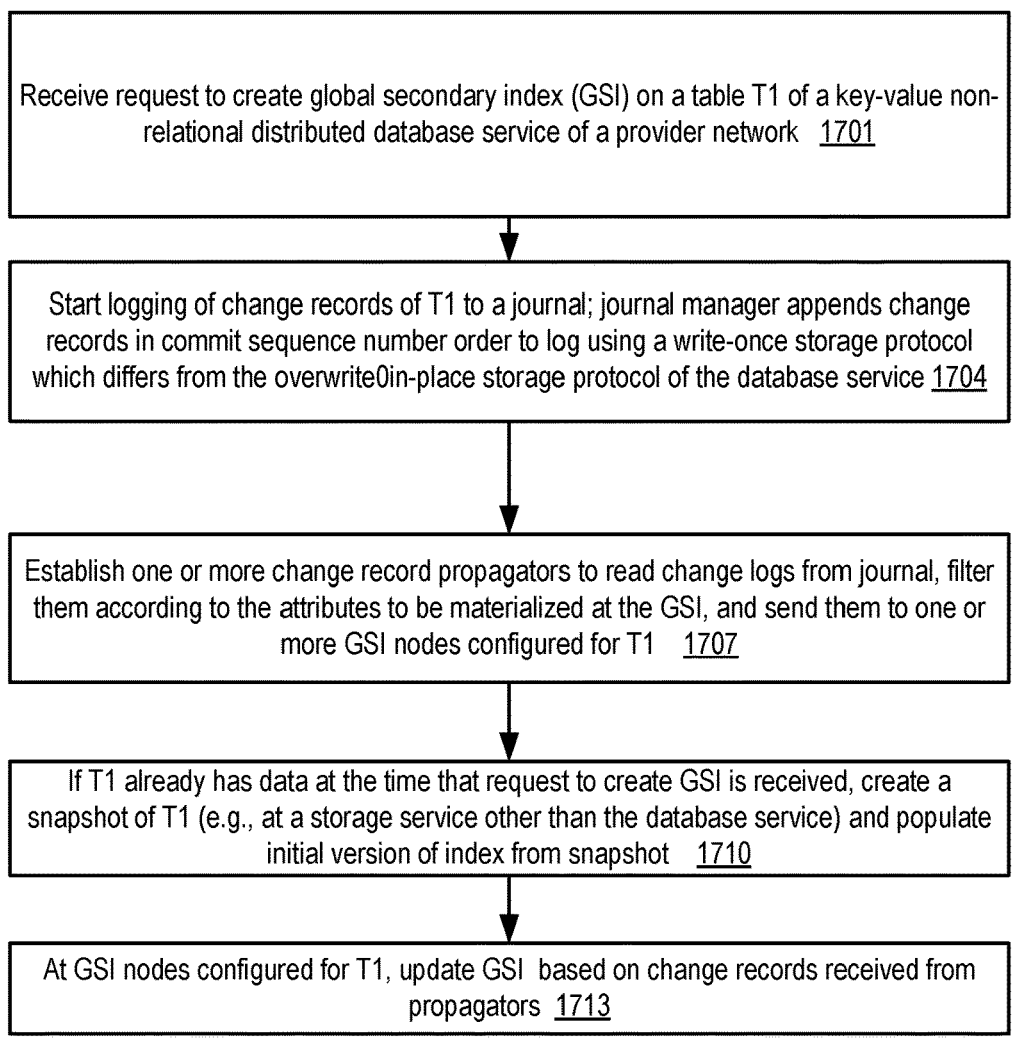
FIG. 17 is a flow diagram illustrating aspects of operations that may be performed to implement global secondary indexes for a distributed database system using a log-structured journal, according to at least some embodiments.

FIG. 17 is a flow diagram illustrating aspects of operations that may be performed to implement global secondary indexes for a distributed database system using a log-structured journal, according to at least some embodiments. As shown in element 1701, a request to create a global secondary index (GSI) for a table T1 of a key-value non-relational distributed database service of a provider network may be received, e.g., at a control-plane component of the database service from a client. The logging of change records of T1 form table storage nodes to a journal may be initiated (element 1704) in response to the GSI creation request in the depicted embodiment, e.g., unless the control-plane of the database service is able to verify that such logging is already underway. The journal may be stored and managed at a different service of the provider network in some implementations, although in other implementations the journal may be a subcomponent of the database service. Each change record may represent a set of writes of a committed transaction directed to T1—for example, the before-image and after-image corresponding to one or more writes may be included in a given change record. A journal manager may append the transmitted change records in commit sequence number order to a journal using a write-once storage protocol in some embodiments, which may differ from the overwrite-in-place storage protocol used for table storage at the database service. The commit sequence number assigned to a given change record may indicate the order in which that record was processed at the journal manager relative to other change records. In various embodiments, the journal manager may be responsible for de-duplication of change records, so that any given write to T1 is represented in the journal exactly once.

In addition to initiating or verifying the transmission of T1 change records to the journal, in at least some embodiments one or more change record propagators may be set up or configured for the requested GSI (element 1707). Such change record propagators may be provided metadata (e.g., by a control-plane component of the database service) about the GSI and/or the base table, which enables them to filter the appended change records to identify the particular subset of logged changes which are to be materialized at a given GSI node. If T1 already has data in it at the time that the GSI creation is requested, a snapshot of T1 may be generated (e.g., at a separate storage service using an approach similar to that described above for continuous data protection support so as to minimize the impact on the table storage nodes of the database) (element 1710). Such a snapshot may be used to generate an initial version of the GSI at one or more index storage nodes. The index storage nodes may themselves be instantiated in response to the GSI creation request in some cases, while in other cases existing index storage nodes (which may have been set up for other GSIs) may be employed in a multi-tenant manner. The change record propagators may transmit selected subsets of changes from the journal to the index storage nodes, and the index storage nodes may use the received changes to materialize the contents of the requested GSI (element 1713).

It is noted that in various embodiments, some of the operations shown in the flow diagrams of FIG. 16 and GIG. 17 may be implemented in a different order than that shown in the figures, or may be performed in parallel rather than sequentially. Additionally, some of the operations shown in the flow diagrams may not be required in one or more implementations.

Use Cases

The techniques described above, of utilizing change records stored a log-structured journals to support continuous data protection and global secondary indexes for base tables of a non-relational database, may be useful in a variety of environments. Some database services may implement a provisioned throughput model, in which the set of resources allocated to a given table may be determined based on a targeted level of throughput requested by the client on whose behalf the table is created. In some cases, the set of storage nodes and devices dedicated to a given table may not always have the performance capacity to support both the provisioned throughput and ancillary operations such as continuous data protection or global secondary index creation. By utilizing a separate highly-available scalable service as an intermediary repository of change records indicating table updates, and/or by instantiating a separate set of nodes for continuous data protection and global secondary index management, the impact of continuous data protection and secondary indexes on the core client-requested read and write operations of the database may be minimized.

Illustrative Computer System

Figure 18:
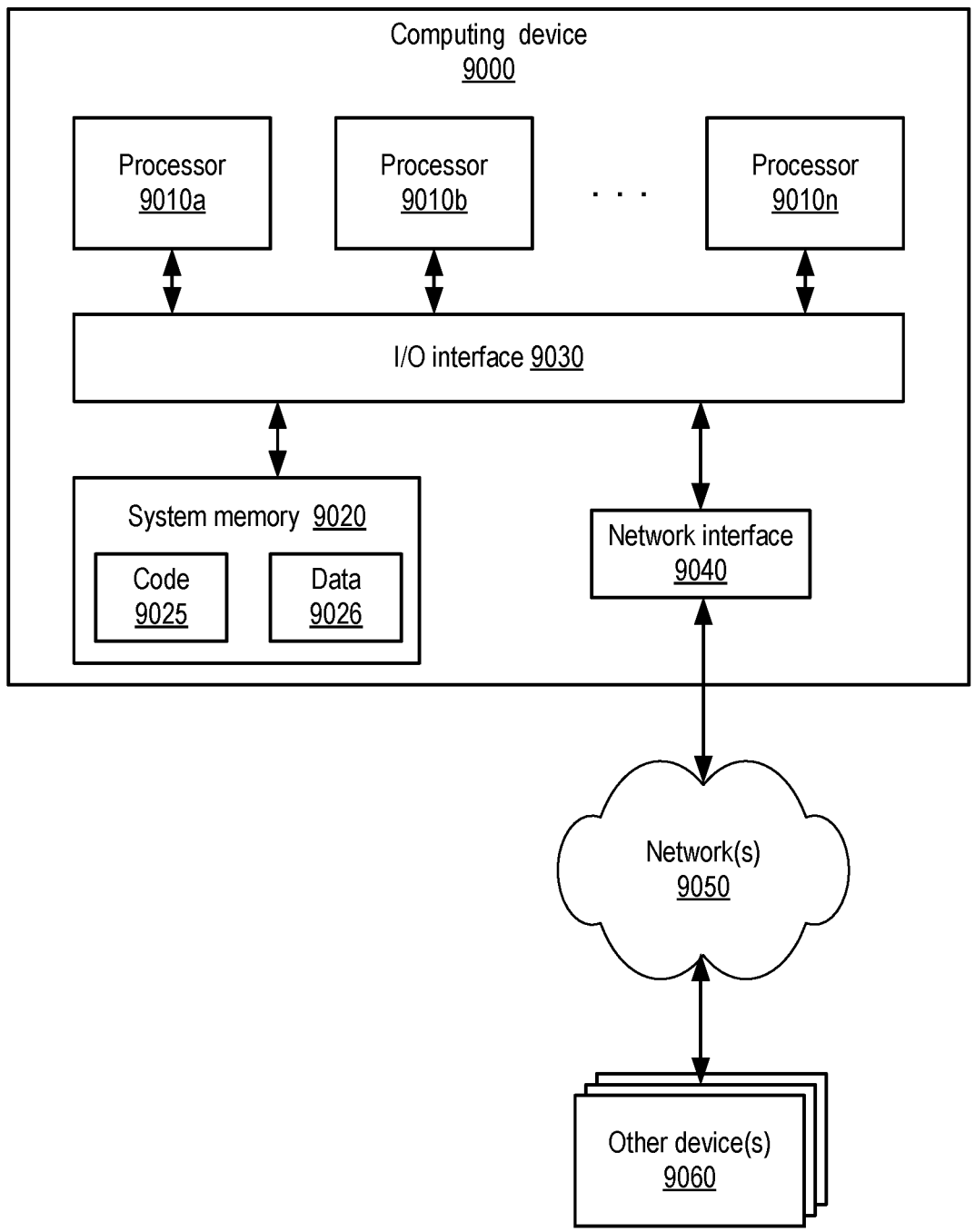
FIG. 18 is a block diagram illustrating an example computing device that may be used in at least some embodiments.

In at least some embodiments, a server that implements one or more of the techniques described above for continuous data protection and secondary indexes at a distributed database (including for example the operations of base table storage nodes, continuous data protection nodes, index storage nodes, request routers, journal managers, change record propagators, and the like) may include a general-purpose computer system that includes or is configured to access one or more computer-accessible media. FIG. 18 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 17, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 17 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 18 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, at one or more computing devices:
      updating a data object as a portion of a committed storage state at a network-accessible service, wherein the network-accessible service provides configurable data protection for individual data objects of the committed storage state, wherein the data protection for a particular data object, when enabled, stores a plurality of versions, including a current version and one or more previous versions, of the particular data object as part of the committed storage state, and wherein, subsequent to updating the data object, the current version of the data object is accessible to one or more clients of the network-accessible service and data protection for the data object is disabled;
      receiving a request specifying that data protection for the data object, currently disabled, is to be enabled to provide for a restore of the data object; and
      in response to receiving the request, enabling data protection for the data object, comprising initiating:
         (a) insertion, into a journal, of one or more records indicating respective writes directed to the data object; and
         (b) creation of one or more snapshots of the data object;
      wherein a particular record of the one or more records inserted into the journal indicating a particular write of the respective writes comprises both:
         one or more before-values for the data object modified by the particular write; and
         one or more after-values for the data object modified by the particular write, in the same particular record.

2. The method as recited in claim 1, further comprising performing, at the one or more computing devices:
   in response to determining that the data object is to be restored, restoring the data object using at least a portion of the journal and a snapshot of the one or more snapshots of the data object.

3. The method as recited in claim 1, further comprising performing, at the one or more computing devices:
   inserting, into the journal, one or more time marker records; and
   restoring the data object, wherein the restoring comprises examining the one or more time marker records.

4. The method as recited in claim 1, further comprising performing, at the one or more computing devices:
   in response to receiving a write request directed to the data object, (a) overwriting the data object at the network-accessible service, and (b) inserting a record corresponding to the write request into the journal using a write-once protocol.

5. The method as recited in claim 1, further comprising performing, at the one or more computing devices:
   in response to determining a change in size of the journal, initiating a creation of a particular snapshot of the data object; and
   utilizing the particular snapshot and at least a portion of the journal to restore the data object.

6. The method as recited in claim 1, further comprising performing, at the one or more computing devices:
   storing, in the journal, a timestamp based at least in part on a local clock time of a node of the network-accessible service at which at least a portion of the data object is stored; and
   restoring the data object, wherein said restoring comprises examining the timestamp.

7. A system, comprising:
   one or more computing devices;
   wherein the one or more computing devices include instructions that upon execution on or across one or more processors cause the one or more computing devices to:
      update a data object as a portion of a committed storage state at a network-accessible service, wherein the network-accessible service provides configurable data protection for individual data objects of the committed storage state, wherein the data protection for a particular data object, when enabled, stores a plurality of versions, including a current version and one or more previous versions, of the particular data object as part of the committed storage state, and wherein, subsequent to updating the data object, the current version of the data object is accessible to one or more clients of the network-accessible service and data protection for the data object is disabled;

receive a request specifying that data protection for the data object, currently disabled, is to be enabled to provide for a restore of the data object; and in response to receiving the request, enable data protection for the data object, wherein to enable data protection for the data object the instructions that upon execution on or across the one or more processors cause the one or more computing devices to initiate:
  (a) insertion, into a journal, of one or more records indicating respective writes directed to the data object; and
  (b) creation of one or more snapshots of the data object;

wherein a particular record of the one or more records inserted into the journal indicating a particular write of the respective writes comprises both:
  one or more before-values for the data object modified by the particular write; and
  one or more after-values for the data object modified by the particular write, in the same particular record.

8. The system as recited in claim 7, wherein the one or more computing devices include further instructions that upon execution on or across the one or more processors further cause the one or more computing devices to:
  in response to determining that the data object is to be restored, restore the data object using at least a portion of the journal and a snapshot of the one or more snapshots of the data object.

9. The system as recited in claim 7, wherein the one or more computing devices include further instructions that upon execution on or across the one or more processors further cause the one or more computing devices to:
  insert, into the journal, one or more time marker records; and
  examine the one or more time marker records to restore the data object.

10. The system as recited in claim 7, wherein the one or more computing devices include further instructions that upon execution on or across the one or more processors further cause the one or more computing devices to:
  in response to determining a restoration response time of the data object, initiate creation of at least one particular snapshot of the data object.

11. The system as recited in claim 7, wherein the one or more computing devices include further instructions that upon execution on or across the one or more processors further cause the one or more computing devices to:
  in response to determining that data protection for the data object is to be disabled, terminating insertion, into the journal, of records indicating respective writes directed to the data object.

12. The system as recited in claim 7, wherein the one or more computing devices include further instructions that upon execution on or across the one or more processors further cause the one or more computing devices to:
  store, in the journal, a timestamp based at least in part on a local clock time of a node of the network-accessible service at which at least a portion of the data object is stored; and
  restore the data object, wherein said restoring comprises examining the timestamp.

13. One or more non-transitory computer-accessible storage media storing program instructions that when executed on or across one or more processors cause one or more computer systems to:

update a data object as a portion of a committed storage state at a network-accessible service, wherein the network-accessible service provides configurable data protection for individual data objects of the committed storage state, wherein the data protection for a particular data object, when enabled, stores a plurality of versions, including a current version and one or more previous versions, of the particular data object as part of the committed storage state, and wherein, subsequent to updating the data object, the current version of the data object is accessible to one or more clients of the network-accessible service and data protection for the data object is disabled;

receive a request specifying that data protection for the data object, currently disabled, is to be enabled to provide for a restore of the data object; and in response to receiving the request, enable data protection for the data object, wherein to enable data protection for the data object the program instructions that when executed on or across the one or more processors cause the one or more computer systems to initiate:
  (a) insertion, into a journal, of one or more records indicating respective writes directed to the data object; and
  (b) creation of one or more snapshots of the data object;

wherein a particular record of the one or more records inserted into the journal indicating a particular write of the respective writes comprises both:
  one or more before-values for the data object modified by the particular write; and
  one or more after-values for the data object modified by the particular write, in the same particular record.

14. The one or more non-transitory computer-accessible storage media as recited in claim 13, storing further program instructions that when executed on or across one or more processors cause one or more computer systems to:
  in response to determining that the data object is to be restored, restore the data object using at least a portion of the journal and a snapshot of the one or more snapshots of the data object.

15. The one or more non-transitory computer-accessible storage media as recited in claim 13, storing further program instructions that when executed on or across one or more processors cause one or more computer systems to:
  insert, into the journal, one or more time marker records; and
  examine the one or more time marker records to restore the data object.

16. The one or more non-transitory computer-accessible storage media as recited in claim 13, storing further program instructions that when executed on or across one or more processors cause one or more computer systems to:
  in response to determining a restoration response time of the data object, initiate creation of at least one particular snapshot of the data object.

17. The one or more non-transitory computer-accessible storage media as recited in claim 13, storing further program instructions that when executed on or across one or more processors cause one or more computer systems to:
  in response to the determining that data protection for the data object is to be enabled, verify that the data object has been configured for automated snapshot generation.

* * * * *